United States Patent [19]
Reichert et al.

[11] Patent Number: 5,750,662
[45] Date of Patent: May 12, 1998

[54] DISAZO DYES CONTAINING HALOACRYLOYLAMINO OR DIHALOPROPIONYLAMINO AND SUBSTITUTED TRIAZINYL REACTIVE GROUPS

[75] Inventors: Hans Reichert, Rheinfelden; Bernhard Müller, Efringen-Kirchen, both of Germany; Athanassios Tzikas, Pratteln, Switzerland

[73] Assignee: Ciba Specialty Chemicals Corporation, Tarrytown, N.Y.

[21] Appl. No.: 834,403

[22] Filed: Apr. 16, 1997

[30] Foreign Application Priority Data

Apr. 24, 1996 [CH] Switzerland ............... 1035/96

[51] Int. Cl.$^6$ .................. C09B 62/475; D06P 1/38
[52] U.S. Cl. .................. 534/612; 534/634; 534/637
[58] Field of Search ............... 534/612, 634, 534/637

[56] References Cited

U.S. PATENT DOCUMENTS

| 5,200,511 | 4/1993 | Loeffler et al. | 534/634 |
| 5,552,532 | 9/1996 | Klier et al. | 534/612 |
| 5,625,042 | 4/1997 | Jager et al. | 534/637 |

FOREIGN PATENT DOCUMENTS

| 0648452 | 5/1964 | Belgium. |
| 0625549 | 11/1994 | European Pat. Off.. |
| 4424733 | 1/1995 | Germany. |

OTHER PUBLICATIONS

Derwent Abst. 95-053311 [08] of DE 4424733 A. 1995.

Primary Examiner—Fiona T. Powers
Attorney, Agent, or Firm—David R. Crichton

[57] ABSTRACT

Compounds of the formula

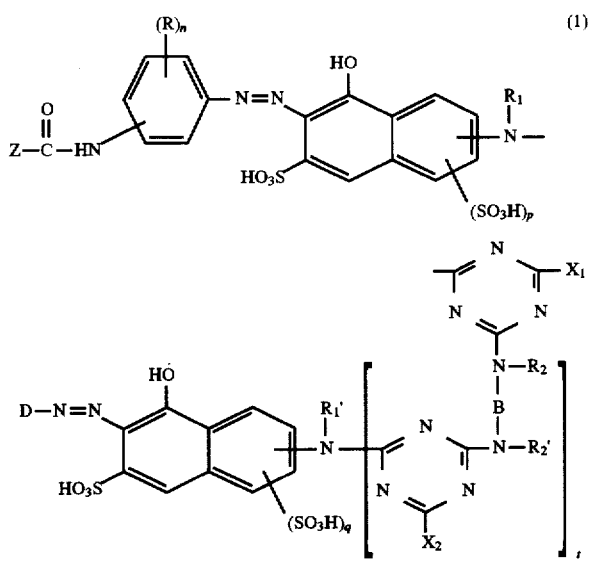

(1)

in which the variables are as defined in the claims, which are suitable as fibre-reactive dyes for dyeing or printing widely varying fibre materials, are described.

17 Claims, No Drawings

DISAZO DYES CONTAINING HALOACRYLOYLAMINO OR DIHALOPROPIONYLAMINO AND SUBSTITUTED TRIAZINYL REACTIVE GROUPS

The present invention relates to novel reactive dyes, processes for their preparation and their use for dyeing or printing textile fibre materials.

The practice of dyeing using reactive dyes has recently lead to increased requirements regarding the quality of the dyeings and the profitability of the dyeing process. There is consequently still a demand for novel reactive dyes which have improved properties, in particular in respect of application.

Reactive dyes which have an adequate substantivity and at the same time show a good ease of washing off of the non-fixed portions are now required for dyeing. They should furthermore show a good tinctorial yield and have a high reactivity, and in particular dyeings having high degrees of fixing should be produced. These requirements are not met in all properties by the known dyes.

The present invention is therefore based on the object of discovering novel, improved reactive dyes for dyeing and printing fibre materials which have the qualities characterized above to a high degree. In particular, the novel dyes should be distinguished by high fixing yields and high fibre-dye bond stabilities, and furthermore the portions not fixed to the fibre should be easy to wash off. They should furthermore produce dyeings having good allround properties, for example light- and wetfastness properties.

It has been found that the object described is largely achieved by the novel reactive dyes defined below.

The present invention therefore relates to compounds of the formula

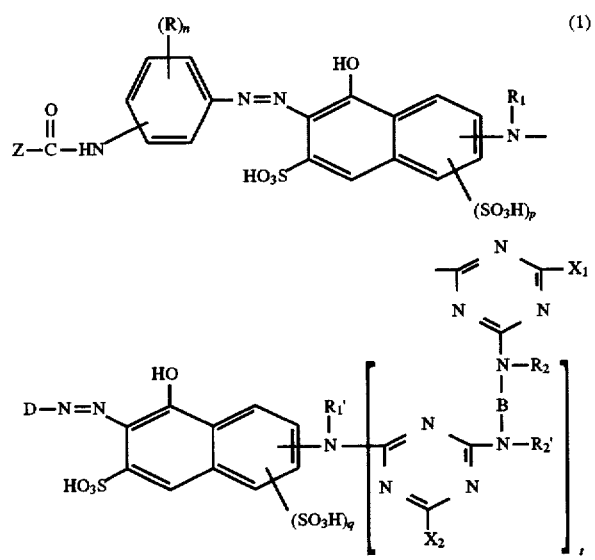

in which B is an aliphatic bridge member, (R)$_n$ is n identical or different radicals from the group consisting of $C_1$–$C_4$alkyl, $C_1$–$C_4$alkoxy, halogen and sulfo, n is the number 0, 1 or 2, $R_1$, $R_1'$, $R_2$ and $R_2'$ independently of one another are each hydrogen or substituted or unsubstituted $C_1$–$C_4$alkyl, $X_1$ and $X_2$ independently of one another are each halogen, 3-carboxypyridin-1-yl or 3-carbamoylpyridin-1-yl, Z is a radical —CHX—CH$_2$—X or —CX=CH$_2$ and X is halogen, D is the radical of a diazo component of the benzene or naphthalene series and p, q and t independently of one another are each the number 0 or 1.

The compounds of the formula (1) contain at least two, preferably 2 to 8, sulfo groups, each of which is present either in the form of its free acid or, preferably, as salts thereof. Salts are, for example, the alkali metal, alkaline earth metal or ammonium salts, salts of an organic amine or mixtures thereof. Examples are sodium, lithium, potassium or ammonium salts, the salt of mono-, di- or triethanolamine or Na/Li or Na/Li/NH$_4$ mixed salts.

An aliphatic bridge member B is, for example, straight-chain or branched $C_2$–$C_2$alkylene which is unsubstituted or substituted by hydroxyl, $C_1$–$C_4$alkoxy, sulfato or sulfo and/ or is interrupted once or several times by —O— or —NR$_3$—, in which R$_3$ is hydrogen or $C_1$–$C_4$alkyl, preferably hydrogen, methyl or ethyl, and particularly preferably hydrogen. B is preferably straight-chain or branched $C_2$–$C_6$alkylene, which is unsubstituted or substituted by hydroxyl, sulfo or sulfato, and is particularly preferably unsubstituted straight-chain or branched $C_2$–$C_6$alkylene. Examples of particularly preferred radicals B are 1,2-ethylene, 1,3-propylene, 2-hydroxy-1,3-propylene, 1,4-butylene,, 2-methyl-1,5-pentylene, 1,6-hexylene and, in particular, 1,2-propylene.

p is preferably the number 1; q is preferably the number 0; and in a preferred embodiment t is the number 0, and in another preferred embodiment the number 1.

Substituted or unsubstituted $C_1$–$C_4$alkyl $R_1$, $R_1'$, $R_2$ or $R_2'$ can be, for example, methyl, ethyl, n- or isopropyl or n-, sec-, tert- or isobutyl which are unsubstituted or substituted, for example by hydroxyl, sulfo, sulfato, carboxyl, cyano, halogen, $C_1$–$C_4$alkoxycarbonyl or carbamoyl.

$R_1$ and $R_1'$ independently of one another are each preferably hydrogen or $C_1$–$C_4$alkyl, particularly preferably hydrogen, methyl or ethyl, and especially preferably hydrogen.

$R_2$ and $R_2'$ independently of one another are each preferably hydrogen or $C_1$–$C_4$alkyl which is unsubstituted or substituted by hydroxyl, particularly preferably hydrogen, methyl, ethyl or β-hydroxyethyl, and especially preferably hydrogen.

$X_1$ and $X_2$ independently of one another are each preferably fluorine or chlorine. $X_1$ and $X_2$ can be identical or different. $X_1$ is particularly preferably chlorine.

X is preferably bromine or chlorine, and particularly preferably bromine.

R is preferably methyl, methoxy, chlorine or sulfo, and particularly preferably sulfo, methyl or methoxy.

n is preferably the number 1 or 2, and particularly preferably the number 1.

(R)$_n$ is preferably 1 or 2 identical or different radicals from the group consisting of methyl, methoxy and sulfo, and particularly preferably 1 or 2 sulfo groups.

D is a phenyl or naphthyl radical which is unsubstituted or further substituted by substituents customary in dyes.

Suitable substituents on the phenyl or naphthyl radical D are, for example: $C_1$–$C_{12}$alkyl, in particular $C_1$–$C_4$alkyl, which generally comprises methyl, ethyl, n- or isopropyl or n-, iso-, sec- or tert-butyl, $C_1$–$C_8$alkoxy, in particular $C_1$–$C_4$alkoxy, which is generally to be understood as meaning methoxy, ethoxy, n- or isopropoxy or n-, iso-, sec- or tert-butoxy, $C_1$–$C_4$alkoxy which is substituted in the alkyl moiety, for example by hydroxyl, $C_1$–$C_4$alkoxy or sulfato, for example 2-hydroxyethoxy, 3-hydroxypropoxy, 2-sulfatoethoxy, 2-methoxyethoxy or 2-ethoxyethoxy, acylamino groups having 2 to 8 carbon atoms, in particular $C_2$–$C_4$alkanoylamino groups, such as acetylamino or propionylamino, benzoylamino or $C_2$–$C_4$alkoxycarbonylamino groups, such as methoxycarbonylamino or ethoxycarbonylamino, alkanoyl groups having 2 to 8 carbon atoms, in particular 2 to 4 carbon atoms, for example acetyl or propionyl, benzoyl, $C_1$–$C_4$alkoxycarbonyl, which generally comprises, for example, methoxycarbonyl or ethoxycarbonyl, $C_1$–$C_4$alkylsulfonyl, such as methylsulfonyl or ethylsulfonyl, phenyl- or naphthylsulfonyl, trifluoromethyl, nitro, cyano, hydroxyl, halogen, which generally comprises fluorine, bromine or, in particular, chlorine, carbamoyl, N-$C_1$–$C_4$alkylcarbamoyl, such as N-methylcarbamoyl or N-ethylcarbamoyl, sulfamoyl, N-$C_1$–$C_4$alkylsulfamoyl, such as N-methylsulfamoyl, N-ethylsulfamoyl, N-propylsulfamoyl, N-isopropylsulfamoyl or N-butylsulfamoyl, N-(β-hydroxyethyl)sulfamoyl, N,N-di-(β-hydroxyethyl)sulfamoyl, N-phenylsulfamoyl, ureido, carboxyl, sulfomethyl, sulfo, sulffato or a reactive radical of the formula

—NH—C(O)—Z     (2),

—SO$_2$—Y      (3),

—CONH—(CH$_2$)$_r$—SO$_2$—Y   (4),

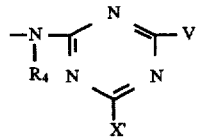     (5)

or

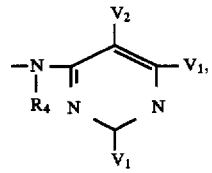     (6)

in which R$_4$ is hydrogen or substituted or unsubstituted $C_1$–$C_4$alkyl,

Y is vinyl or a radical —CH$_2$—CH$_2$—U and U is a group which can be split off under alkaline conditions, r is an integer from 1 to 6, Z is as defined above, X' is a group which can be split off as an anion, V$_1$ is fluorine or chlorine, V$_2$ is chlorine, nitro, cyano, $C_1$–$C_4$alkylsulfonyl, carboxyl, hydroxyl, $C_1$–$C_4$alkoxysulfonyl, $C_1$–$C_4$alkylsulfinyl, $C_1$–$C_4$alkoxycarbonyl or $C_2$–$C_4$alkanoyl and V is a group which can be split off as an anion, a non-reactive substituent or a radical of the formula

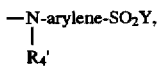    (7a)

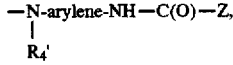    (7b)

—NH—(CH$_2$)$_{2-3}$—SO$_2$Y or   (7c)

—NH—(CH$_2$)$_{2-3}$—O—(CH$_2$)$_{2-3}$—SO$_2$Y,   (7d)

in which

R$_4$' is hydrogen or substituted or unsubstituted $C_1$–$C_4$alkyl, arylene is a phenylene or naphthylene radical which is unsubstituted or substituted by sulfo, carboxyl, $C_1$–$C_4$alkyl, $C_1$–$C_4$alkoxy or halogen and Z and Y are as defined and preferred above.

Substituted or unsubstituted $C_1$–$C_4$alkyl R$_4$ and R$_4$' can be, for example, methyl, ethyl, n- or isopropyl or n-, sec-, tert- or isobutyl which are unsubstituted or substituted, for example by hydroxyl, sulfo, sulfato, carboxyl, cyano, halogen, $C_1$–$C_4$alkoxycarbonyl or carbamoyl.

R$_4$ and R$_4$' independently of one another are each preferably hydrogen or $C_1$–$C_4$alkyl, particularly preferably hydrogen, methyl or ethyl, and especially preferably hydrogen.

If a radical —CH$_2$—CH$_2$—U is Y, the leaving group U can be, for example, —Cl, —Br, —F, —OSO$_3$H, —SSO$_3$H, —OCO—CH$_3$, OPO$_3$H$_2$, —OCO—C$_6$H$_5$, OSO$_2$—$C_1$–$C_4$alkyl or —OSO$_2$—N($C_1$–$C_4$alkyl)$_2$. U is preferably a group of the formula —Cl, —OSO$_3$H, —SSO$_3$H, —OCO—CH$_3$, —OCO—C$_6$H$_5$ or —OPO$_3$H$_2$, in particular —Cl or —OSO$_3$H, and particularly preferably —OSO$_3$H.

Y is preferably vinyl, β-chloroethyl, β-sulfatoethyl, β-thiosulfatoethyl, β-acetoxyethyl, β-phenoxyethyl or β-phosphatoethyl, and particularly preferably β-sulfatoethyl or vinyl.

r is preferably the number 2, 3 or 4, particularly preferably the number 2 or 3, and especially preferably the number 2.

The radical Z is as defined and preferred above.

X' is, for example, fluorine, chlorine, bromine, sulfo, C–$C_4$alkylsulfonyl or phenylsulfonyl, and preferably fluorine or chlorine.

The radicals V$_1$ can be identical or different from one another, and one of the radicals V$_1$ is preferably chlorine.

The radical V$_2$ is preferably chlorine, cyano or methylsulfonyl. V$_2$ is particularly preferably chlorine.

Arylene is preferably a phenylene radical, in particular a 1,3- or 1,4-phenylene radical, which is unsubstituted or substituted, for example by sulfo, methyl, methoxy or carboxyl.

A group V which can be split off as an anion here is, for example, fluorine, chlorine, bromine, sulfo, $C_1$–$C_4$alkylsulfonyl or phenylsulfonyl, and preferably fluorine or chlorine.

A non-reactive substituent V can be, for example, hydroxyl; $C_1$–$C_4$alkoxy; $C_1$–$C_4$alkylthio; amino; amino which is mono- or disubstituted by $C_1$–$C_8$alkyl, in which the alkyl is unsubstituted or further substituted, for example by sulfo, sulfato, hydroxyl, carboxyl or phenyl, in particular by sulfo or hydroxyl, and is uninterrupted or interrupted by a radical —O—; cyclohexylamino; morpholino; N-$C_1$–$C_4$alkyl-N-phenylamino or phenylamino or naphthylamino, in which the phenyl or naphthyl is unsubstituted or substituted, for example by $C_1$–$C_4$alkyl, $C_1$–$C_4$alkoxy, carboxyl, sulfo or halogen.

Examples of suitable non-reactive substituents V are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N- phenylamino, N-methyl-N-phenylamino, methoxy, ethoxy, n- or isopropoxy and hydroxyl.

A non-reactive substituent V is preferably amino; N-mono- or N,N-di-$C_1$-$C_4$alkylamino which, in the alkyl moiety, is unsubstituted or substituted by hydroxyl, sulfato or sulfo and is uninterrupted or interrupted by a radical —O—; morpholino; phenylamino or N-$C_1$-$C_4$alkyl-N-phenylamino, in which the phenyl is in each case unsubstituted or substituted by sulfo, carboxyl, methyl or methoxy. V is particularly preferably N-mono- or N,N-di-$C_1$-$C_4$alkylamino which, in the alkyl moiety, is unsubstituted or substituted by hydroxyl or sulfo and is uninterrupted or interrupted by a radical —O—.

Preferred reactive radicals V are those of the formulae (7a) and (7b), in particular those of the formula (7a). In these, Z is preferably the group —CHBr—$CH_2$—Br or —CBr=$CH_2$ and Y is vinyl or β-sulfatoethyl.

V is preferably fluorine or chlorine; N-mono- or N,N-di-$C_1$-$C_4$alkylamino which, in the alkyl moiety, is unsubstituted or substituted by hydroxyl or sulfo and is uninterrupted or interrupted by a radical —O—; or a reactive radical of the formulae (7a) to (7d).

V is particularly preferably N-mono- or N,N-di-$C_1$-$C_4$alkylamino which, in the alkyl moiety, is unsubstituted or substituted by hydroxyl or sulfo and is uninterrupted or interrupted by a radical —O—; or a reactive radical of the formula (7a) or (7b), in particular of the formula (7a).

V is especially preferably a reactive radical of the formula (7a) or (7b), in particular of the formula (7a).

Preferred reactive radicals D are those of the formulae (2), (3), (4) or (5), in particular of the formulae (2), (3) or (5), and preferably of the formulae (2) or (3). In these, Z is preferably the group —CHBr—$CH_2$—Br or —CBr=$CH_2$ and Y is vinyl or β-sulfatoethyl.

If the radical D carries one or more non-reactive substituents, these are preferably sulfo, $C_1$-$C_4$alkyl, $C_1$-$C_4$alkoxy or halogen, and particularly preferably sulfo, methyl or methoxy.

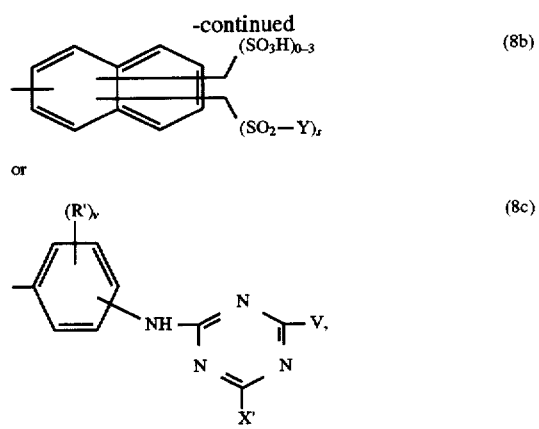

in which (R')$_v$ is v identical or different radicals from the group consisting of sulfo, $C_1$-$C_4$-alkyl, $C_1$-$C_4$alkoxy and halogen, v is the number 0, 1, 2 or 3 and s is the number 0 or 1 and Y, X' and V are as defined and preferred above. Radicals D of the formulae (8a) and (8b) defined above are preferred. Particularly preferred radicals D have the formula (8a) defined above, in which (R')$_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is ≧1.

A preferred group of compounds according to the invention has the formula (1) defined above, in which B is straight-chain or branched $C_2$-$C_6$alkylene, which is unsubstituted or substituted by hydroxyl, sulfo or sulfato, (R)$_n$ is n identical or different radicals from the group consisting of $C_1$-$C_4$alkyl, $C_1$-$C_4$alkoxy and sulfo, n is the number 0, 1 or 2, $R_1$ and $R_1'$ independently of one another are each hydrogen or $C_1$-$C_4$alkyl, $R_2$ and $R_2'$ independently of one another are each hydrogen or $C_1$-$C_4$alkyl which is unsubstituted or substituted by hydroxyl, $X_1$ and $X_2$ independently of one another are each chlorine or fluorine, Z is a radical —CHX—$CH_2$—X or —CX=$CH_2$ and X is chlorine or bromine, D is a phenyl or naphthyl radical which is unsubstituted or substituted by sulfo, $C_1$-$C_4$alkyl, $C_1$-$C_4$alkoxy, halogen or by a fibre-reactive radical —$SO_2$—Y, Y is vinyl or β-sulfatoethyl and p, q and t independently of one another are each the number 0 or 1.

A group of particularly preferred compounds has the formula

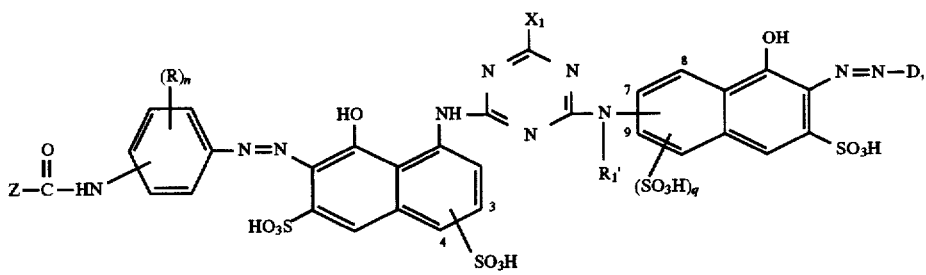

Preferred radicals D have, for example, the formula

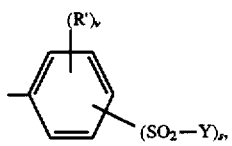

in which Z is the group —CHBr—$CH_2$Br or —CBr=$CH_2$, (R)$_n$ is 0 to 2 identical or different radicals from the group consisting of sulfo, methyl and methoxy, $X_1$ is chlorine, $R_1'$ is hydrogen, methyl or ethyl, q is the number 0 or 1 and D is as defined and preferred above, in particular in which D is a radical of the formula

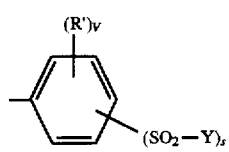
(8a)

in which $(R')_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is $\geq 1$.

Particularly preferred compounds of the formula (1a) are those in which (i) $(R')_v$ is 1 or 2 sulfo groups;

(ii) the 2nd sulfo group in the left-hand aminonaphtholsulfonic acid radical is bonded in the 3-position;

(iii) q is the number 0 and the radical —NR$_1$ is bonded in the 6-position on the right-hand aminonaphtholsulfonic acid radical;

(iv) D is a phenyl radical which is substituted by 1 to 3 identical or different radicals from the group consisting of methyl, methoxy and sulfo; and (v) D is a phenyl radical which is substituted by a group —SO$_2$—Y, in which Y is as defined and preferred above, and carries no further radicals or is further substituted by methyl, methoxy or sulfo.

Another group of particularly preferred compounds has the formula

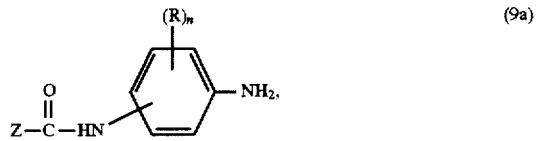
(9a)

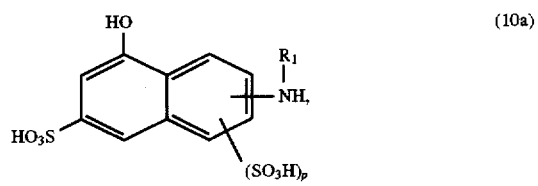
(9b)

(10a)

(10b)

comprises reacting in each case approximately 1 molar equivalent of a compound of the formula

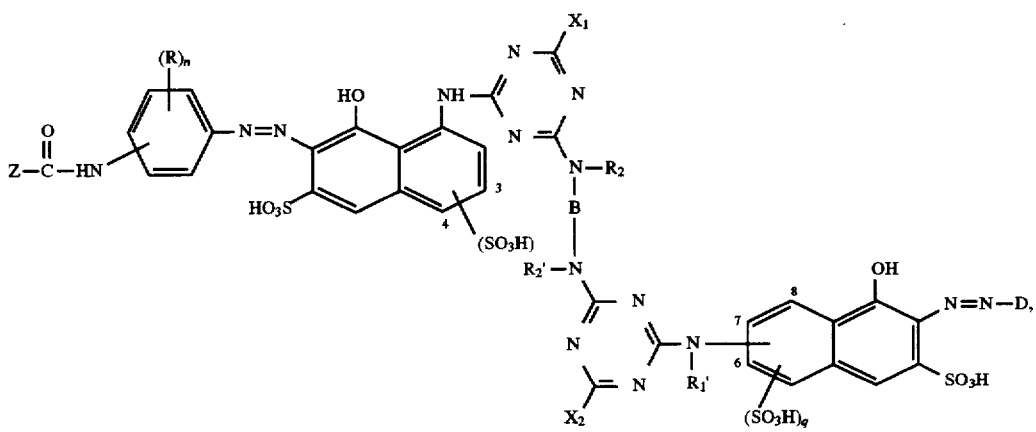
(1b)

in which Z is the group —CHBr—CH$_2$Br or —CBr=CH$_2$, $(R)_n$ is 0 to 2 identical or different radicals from the group consisting of sulfo, methyl and methoxy, X$_1$ is chlorine and X$_2$ is chlorine or fluorine, R$_1$' is hydrogen, methyl or ethyl and R$_2$ and R$_2$' independently of one another are each hydrogen, methyl, ethyl or β-hydroxyethyl, q is the number 0 or 1 and D is as defined and preferred above, in particular in which D is a radical of the formula

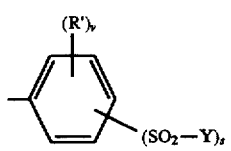
(8a)

in which $(R')_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is $\geq 1$.

The present invention furthermore relates to a process for the preparation of the compounds of the formula (1) which

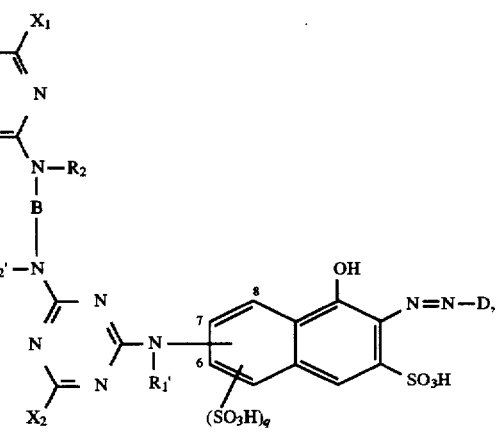

-continued

(11a)

and, if t is the number 1, additionally in each case approximately 1 molar equivalent of a compound of the formula

(11b)

and $R_2'HN—B—NHR_2$, (12)

in which $B$, $D$, $(R)_n$, $R_1$, $R_1'$, $R_2$, $R_2'X_1$, $X_2$, $Z$, $p$, $q$ and $t$ are in each case as defined above, with one another in any order.

The diazotization of the compounds of the formulae (9a) and (9b) and their coupling to the compounds of the formulae (10a) and (10b) or a reaction product of the compounds of the formulae (10a) and (11a) or, where appropriate, (10b) and (11b) and (12), are carried out in the customary manner, for example by diazotizing the compound of the formula (9a) or (9b) in mineral acid solution, for example hydrochloric acid solution, with a nitrite, for example sodium nitrite, at a low temperature, for example at 0° to 5° C., and then coupling the product with the corresponding coupling component in a neutral to slightly acid medium, for example at pH 3 to 7, and preferably 5 to 6.5, and low temperatures, for example 0° to 30° C.

The condensation reactions between the compounds of the formulae (10a), (10b), (11a), (11b) and (12) are in general carried out analogously to known processes, as a rule in aqueous solution at temperatures of, for example, 0° to 50° C. and a pH of, for example, 4 to The most important process variants are described in the examples.

The compounds of the formulae (9a), (9b), (10a), (10b), (11a), (11b) and (12) are known or can be prepared analogously to known compounds.

The dyes according to the invention are fibre-reactive. Fibre-reactive compounds are to be understood as meaning those which are capable of reacting with the hydroxyl groups of cellulose, the amino, carboxyl, hydroxyl or thiol groups in the case of wool and silk, or with the amino and, where appropriate, with the carboxyl groups of synthetic polyamides to form covalent chemical bonds.

The dyes according to the invention are suitable for dyeing and printing widely varying materials, such as fibre materials containing hydroxyl groups or containing nitrogen. Examples are silk, leather, wool, polyamide fibres and polyurethanes, and in particular all types of cellulosic fibre materials. Such cellulosic fibre materials are, for example, the naturally occurring cellulose fibres, such as cotton, linen and hemp, as well as cellulose and regenerated cellulose. The dyes according to the invention are also suitable for dyeing or printing fibres containing hydroxyl groups which are contained in blend fabrics, for example mixtures of cotton with polyester fibres or polyamide fibres. The dye mixtures according to the invention and the dyes according to the invention are particularly suitable for dyeing or printing cellulosic fibre materials. They can furthermore be used for dyeing or printing naturally occurring or synthetic polyamide fibre materials.

The dyes according to the invention can be applied to the fibre material and fixed on the fibre in various ways, in particular in the form of aqueous dye solutions and dye printing pastes. They are suitable both for the exhaust method and for dyeing by the pad-dyeing method, in which the goods are impregnated with aqueous dye solutions, which contain salts if appropriate, and the dyes are fixed, after an alkali treatment or in the presence of alkali, if appropriate under the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention are distinguished by a high reactivity, good fixing power and very good build-up capacity. They can therefore be employed by the exhaust dyeing method at low dyeing temperatures and require only short steaming times in the pad-steam method. The degrees of fixing are high and the non-fixed portions can easily be washed off, the difference between the degree of exhaustion and degree of fixing being remarkably small, i.e. the soaping loss being very low. The dyes according to the invention, and in particular the dye mixtures according to the invention, are also particularly suitable for printing, in particular on cotton, but also for printing fibres containing nitrogen, for example wool or silk, or blend fabrics which comprise wool or silk.

The dyeings and prints produced with the dyes according to the invention have a high colour strength and a high fibre-dye bond stability both in the acid and in the alkaline range, and furthermore good lightfastness properties and very good wetfastness properties, such as fastnesses to washing, water, seawater, cross-dyeing and perspiration, as well as a good fastness to pleating, fastness to ironing and fastness to rubbing.

The following Examples serve to illustrate the invention. The temperatures are stated in degrees Celsius, parts are parts by weight and the percentage data are based on percentages by weight, unless noted otherwise. Parts by weight bear the same relation to parts by volume as the kilogram to the liter.

EXAMPLE 1

19 parts of cyanuric chloride are thoroughly mixed vigorously with 50 parts of ice/water and 5 parts of disodium hydrogen phosphate, with the addition of a wetting agent. A neutral solution of 32 parts of 1-amino-8-hydroxynaphthalene-3,6-disulfonic acid (H acid) is added dropwise to the suspension formed such that the reaction mixture does not exceed a pH of 3. Thereafter, the pH is kept at 3 for a further 2 hours by addition of sodium hydroxide solution (reaction mixture 1).

28 parts of 2-(4-aminophenylsulfonyl)ethyl hydrogen sulfate are suspended in 300 parts of water and dissolved at pH 6 with saturated sodium carbonate solution, the solution is cooled to 0° C., 7 parts of sodium nitrite, 50 parts of ice and 30 parts of concentrated HCl are added and diazotization is carried out for 2 hours. Thereafter, excess nitrite is destroyed with sulfamic acid (diazo solution 1).

The two reaction mixtures obtained above are combined, the pH is raised to 3.5 with sodium acetate solution in the course of 3 hours and the temperature is kept between 0° and 5° C. The solution is then heated to 30° to 35° C. and a neutral solution of 32 parts of H acid in 300 parts of water is added dropwise such that a pH of 3.5 is not exceeded (reaction solution 2).

40 parts of 5-(2,3-dibromopropionylamido)aniline-2-sulfonic acid are suspended in 400 parts of water, 7 parts of sodium nitrite, 50 parts of ice and 30 parts of concentrated HCl are added and the mixture is stirred for 3 hours. Excess nitrite is destroyed with sulfamic acid and the resulting suspension is added to reaction mixture 2 prepared above. The pH is brought to 7 with dilute sodium hydroxide solution in the course of about 2 hours, the mixture is then heated to an internal temperature of 30° C. and the pH is increased to 11 and kept at this value for 30 minutes with dilute sodium hydroxide solution. At the end, the reaction mixture is brought to a pH of 7 with dilute HCl, desalinated by dialysis and evaporated in vacuo. The compound of the formula

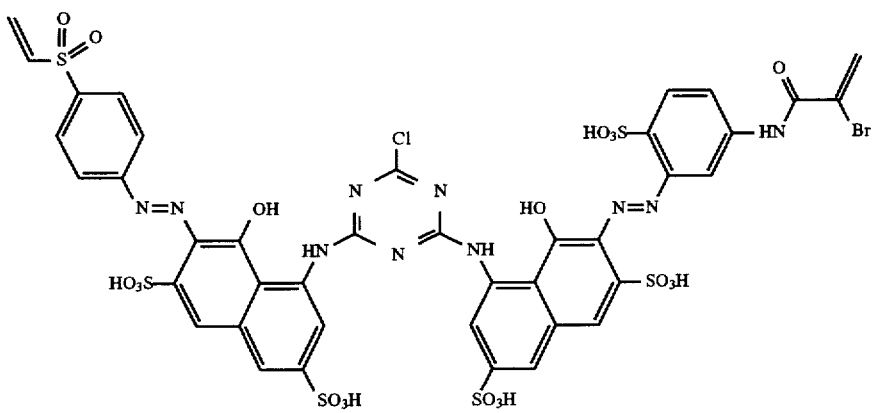

is obtained as a powder which dyes cellulose in red shades with good allround properties.

EXAMPLE 2

19 parts of cyanuric chloride are thoroughly mixed vigorously with 50 parts of ice/water and 5 parts of disodium hydrogen phosphate, with the addition of a wetting agent. A neutral solution of 32 parts of 1-amino-8-hydroxynaphthalene-3,6-disulfonic acid (H acid) is added dropwise to the suspension formed such that the reaction mixture does not exceed a pH of 3. Thereafter, the pH is kept at 3 for a further 2 hours by addition of sodium hydroxide solution (reaction mixture 3).

40 parts of 5-(2,3-dibromopropionylamido)aniline-2-sulfonic acid are suspended in 400 parts of water, 7 parts of sodium nitrite, 50 parts of ice and 30 parts of concentrated HCl are added and the mixture is stirred for 3 hours. Excess nitrite is destroyed with sulfamic acid and the resulting suspension is added to reaction mixture 3 prepared above. The pH is raised to 3.5 with sodium acetate solution in the course of 3 hours, the mixture is heated to 30° to 35° C., a neutral solution of 24 parts of 2-amino-5-hydroxynaphthalene-7-sulfonic acid in 250 parts of water is added dropwise such that a pH of 3.5 is not exceeded and this pH is maintained for a further 5 hours (reaction solution 4).

28 parts of 2-(4-aminophenylsulfonyl)ethyl hydrogen sulfate are suspended in 300 parts of water and dissolved at pH 6 with saturated sodium carbonate solution, the solution is cooled to 0° C., 7 parts of sodium nitrite, 50 parts of ice and 30 parts of concentrated HCl are added and diazotization is carried out for 2 hours. Thereafter, excess nitrite is destroyed with sulfamic acid. The diazonium solution thus obtained is added dropwise to reaction solution 4 prepared above, during which the pH is kept at 7 by addition of sodium hydroxide solution. The mixture is then heated to an internal temperature of 30° C. and the pH is increased to 11 and kept at this value with dilute sodium hydroxide solution for 30 minutes. At the end, the reaction mixture is brought to a pH of 7 with dilute HCl, largely desalinated by dialysis and evaporated in vacuo. The compound of the formula

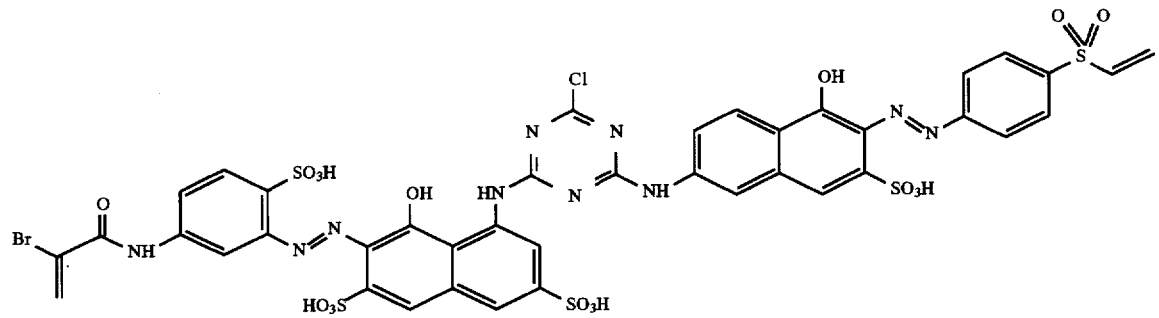

is obtained as a powder which dyes cellulose in red shades with good allround properties.

EXAMPLES 3–25

The following dyes, each of which dyes cellulose in a red shade with good allround properties, can be prepared in a manner analogous to that described in Example 1 or 2.

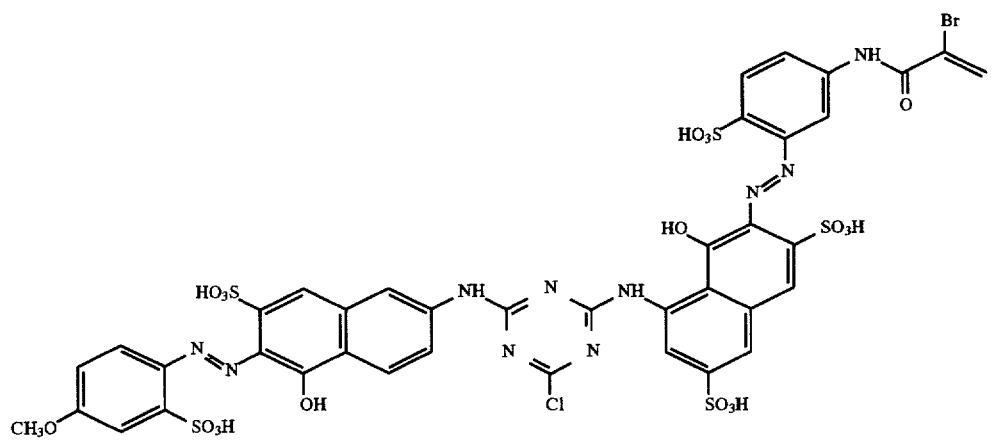
3
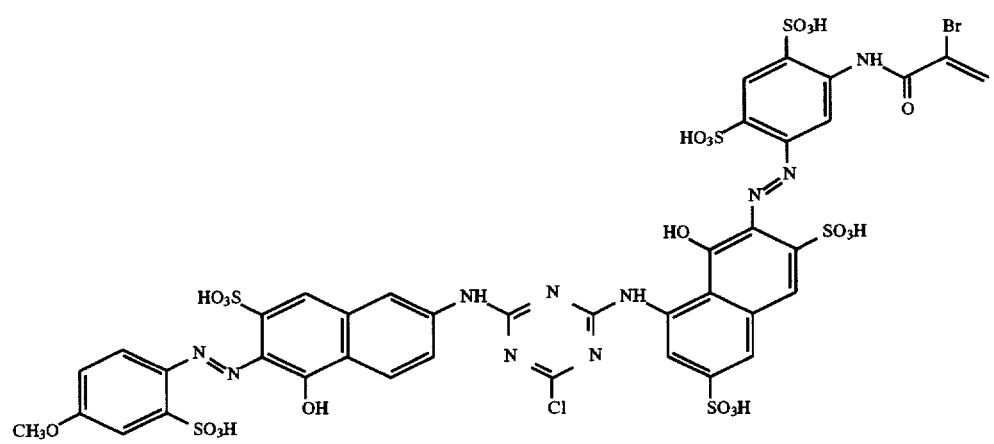
4
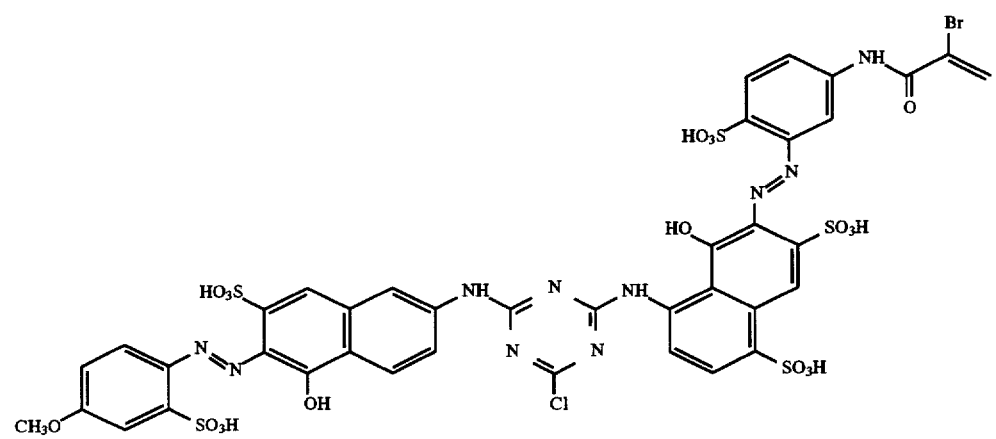
5

-continued
6
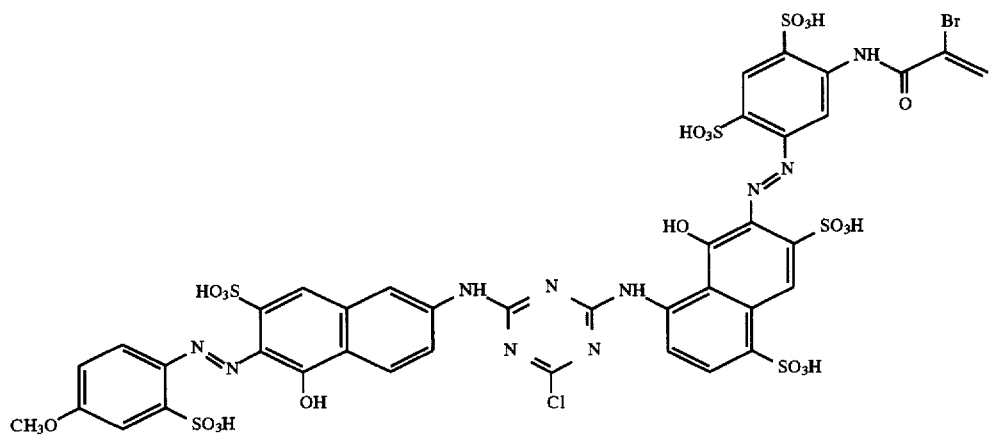
7
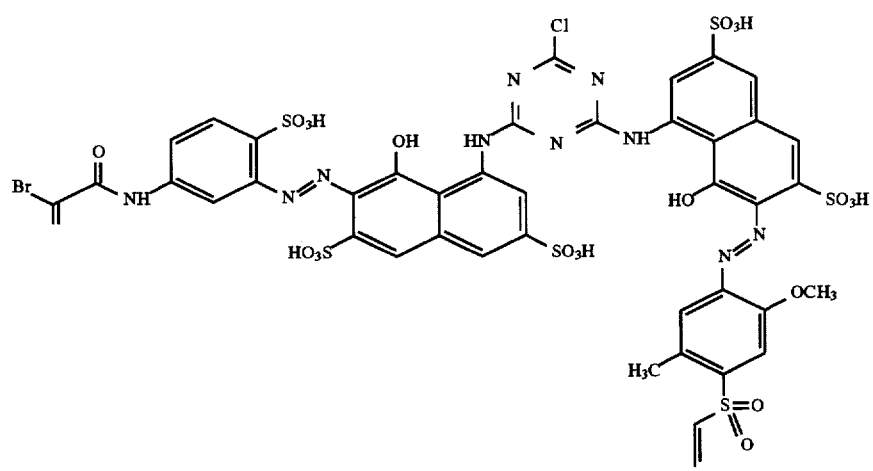
8
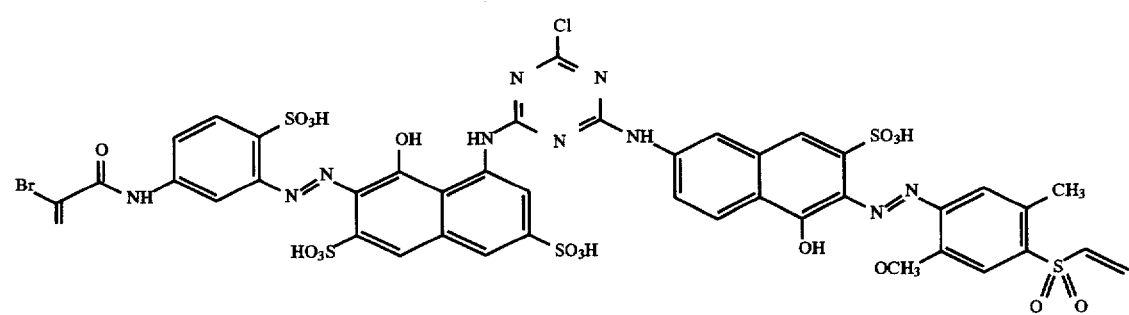
9
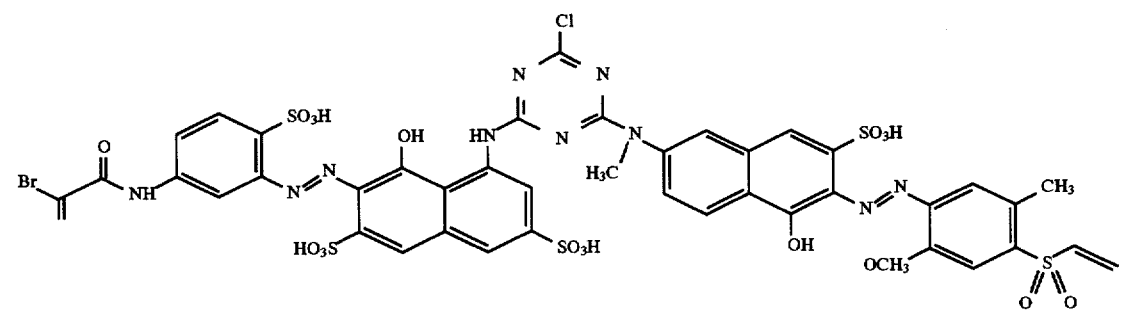

-continued
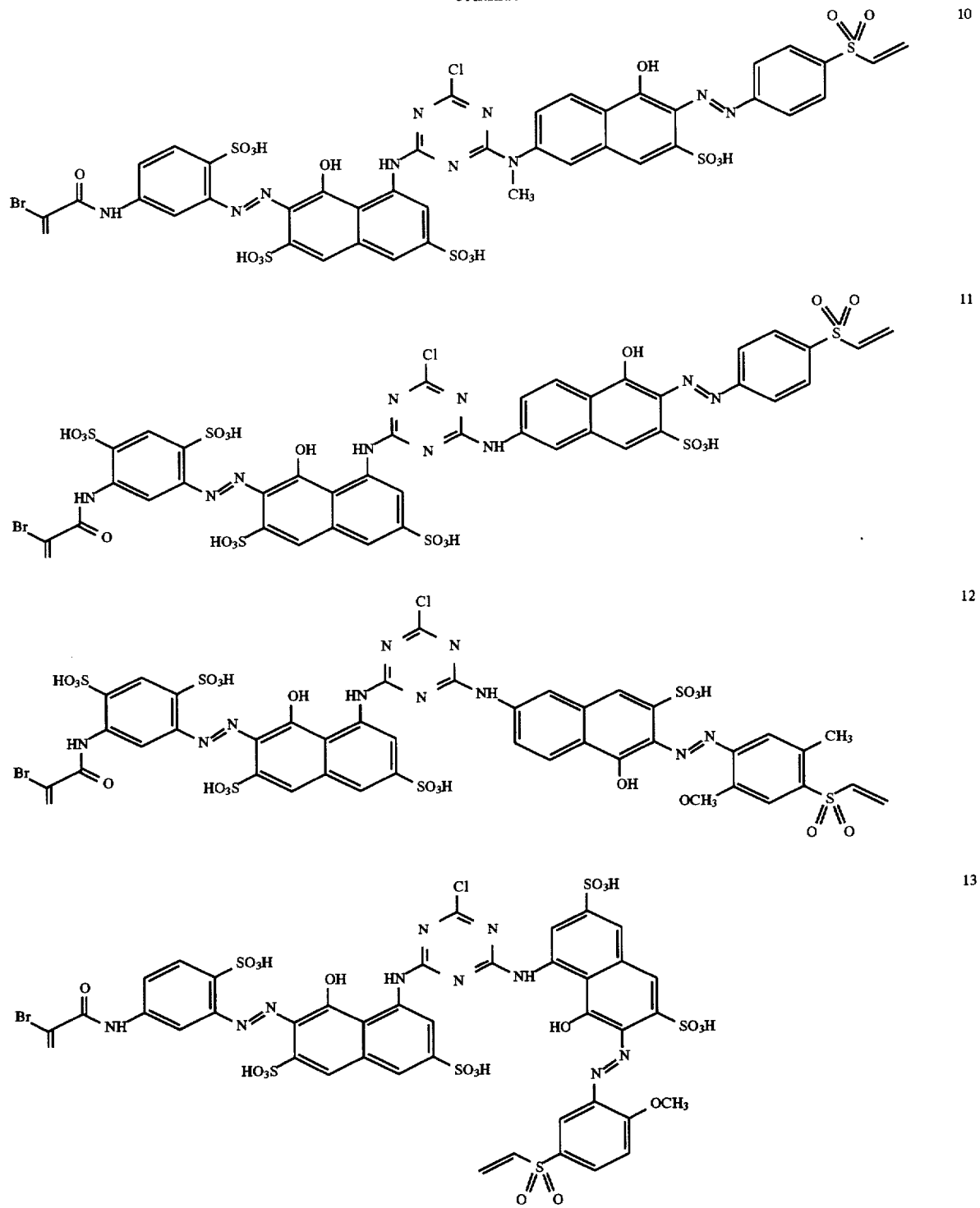

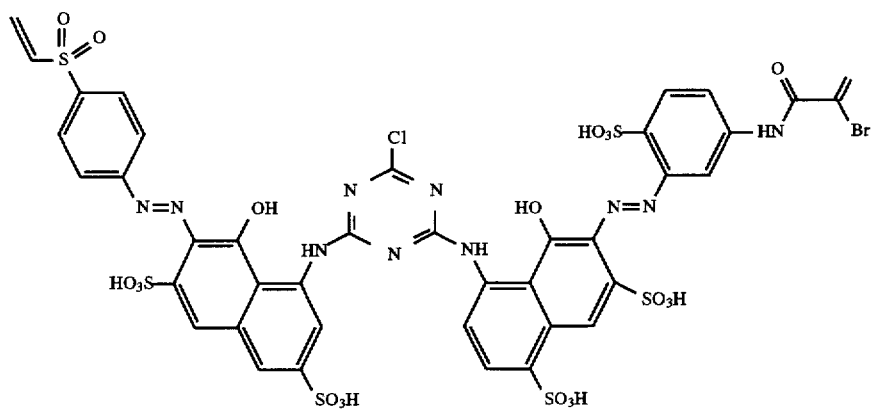
14
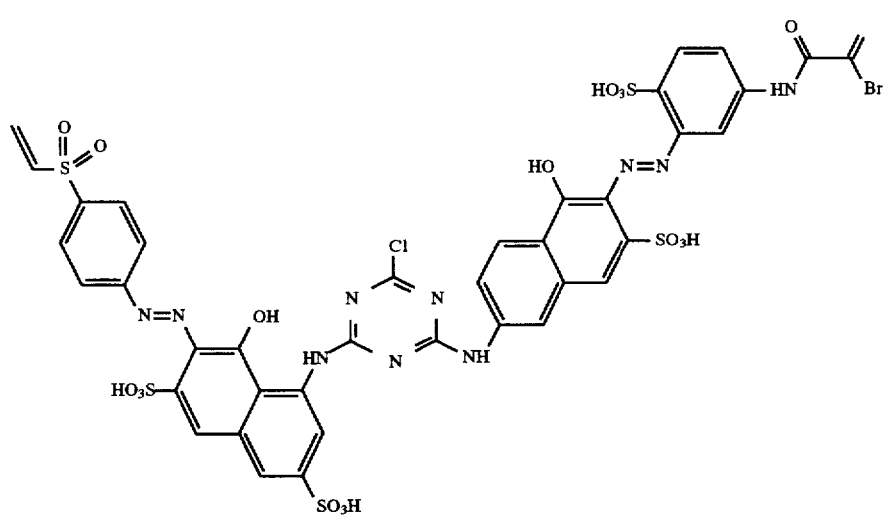
15
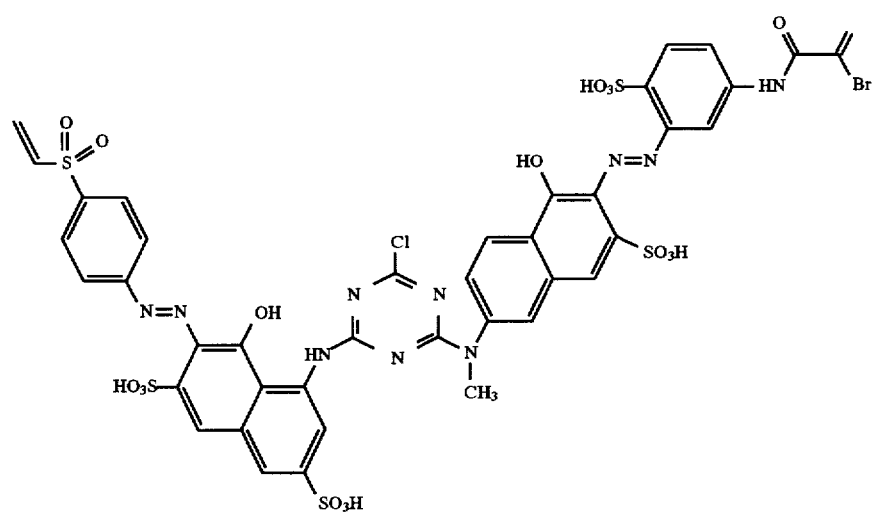
16

-continued
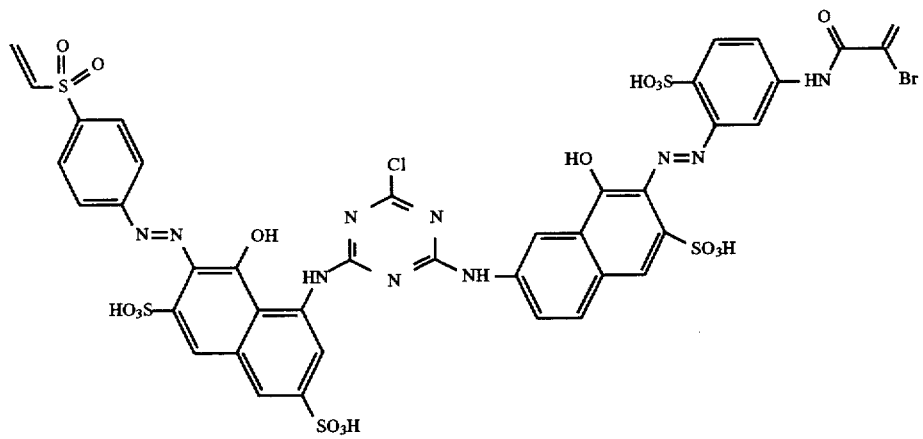
17
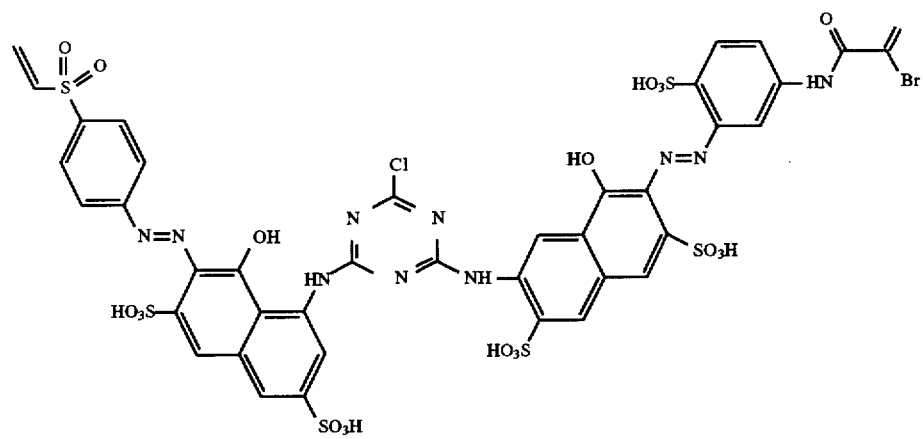
18
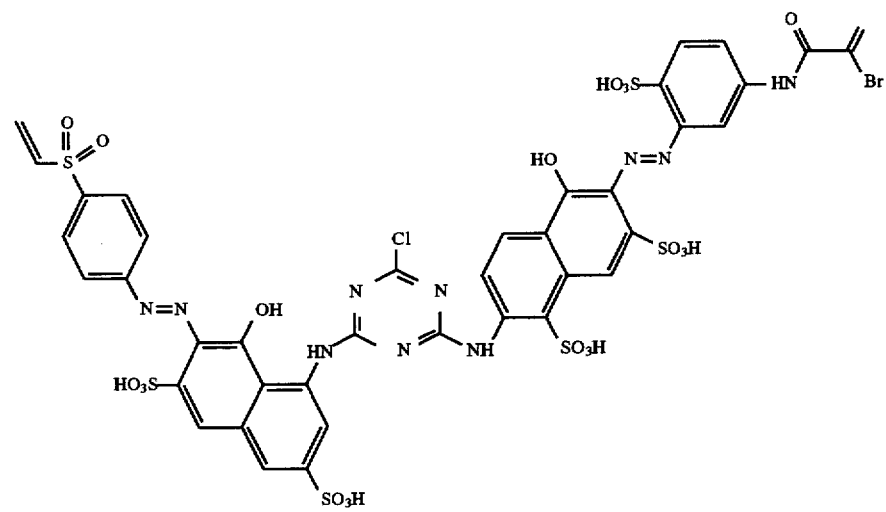
19

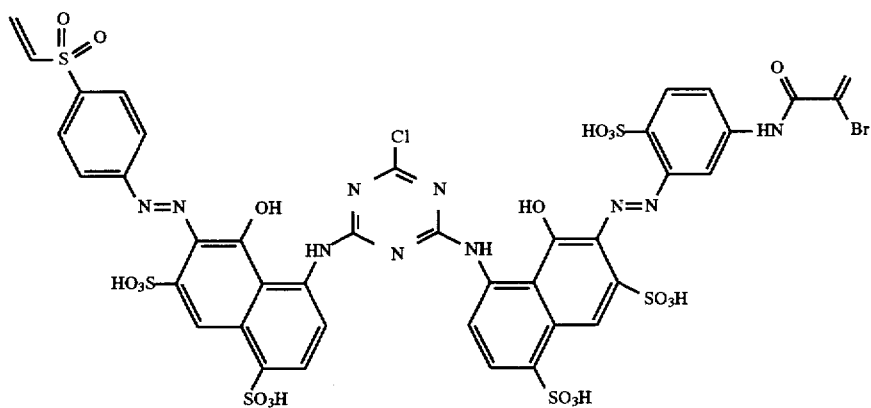
20
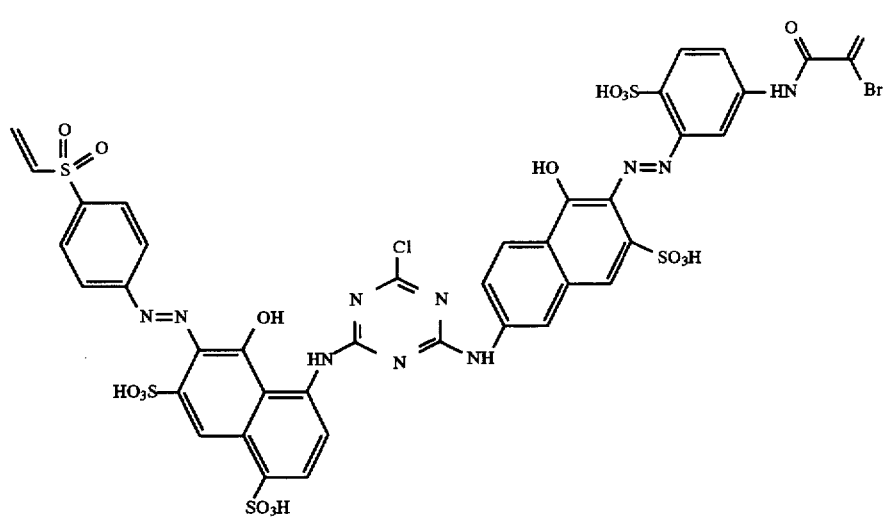
21
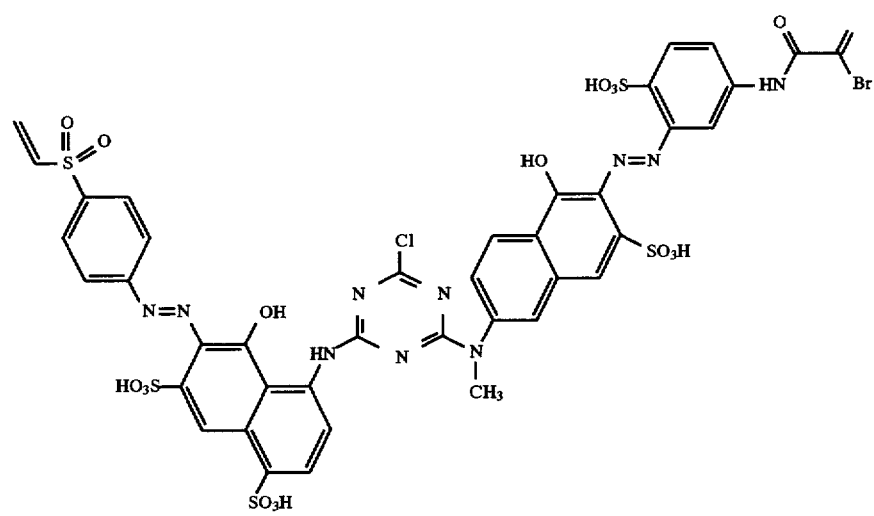
22

-continued

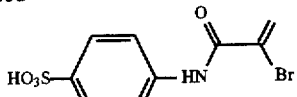
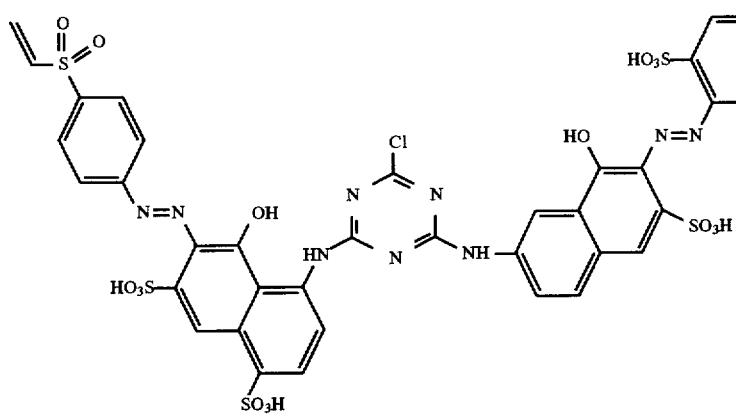

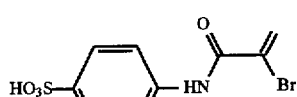
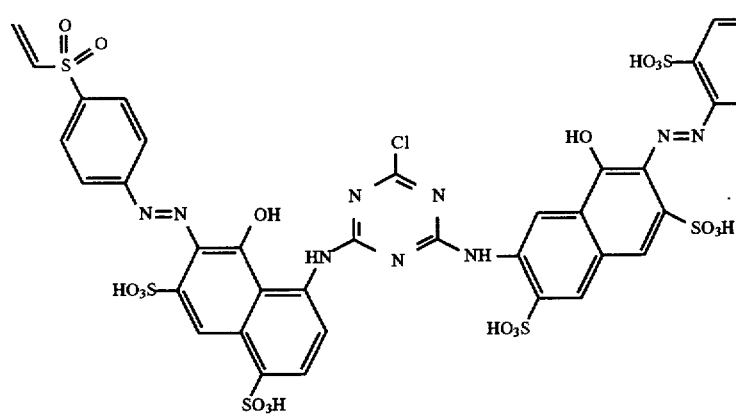

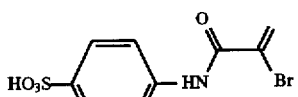
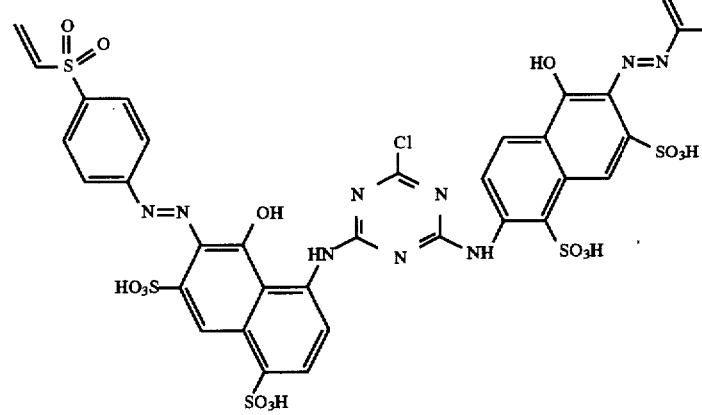

EXAMPLE 26

(i) Diazo solution 1 according to Example 1 is added to reaction mixture 1 according to Example 1 in the course of about 30 minutes, the pH is raised to 4.5 with saturated sodium acetate solution in the course of three hours and the temperature is kept between 0° and 5° C.

When the coupling is complete, a solution, neutralized with hydrochloric acid, of 15 parts of 1,2-diaminopropane in 150 parts of water is added to the resulting reaction mixture, the pH is kept at 5 with 4N sodium hydroxide solution and the mixture is allowed to warm to room temperature. When the reaction has ended, the reaction product of the formula

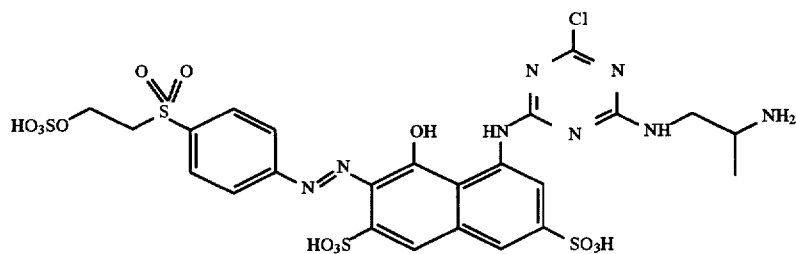

s precipitated out by addition of potassium chloride, filtered off, washed with saturated potassium chloride solution and dried in vacuo at 40° C.

(ii) 40 parts of 5-(2,3-dibromopropionylamido)aniline-2-sulfonic acid are suspended in 400 parts of water, 7 parts of sodium nitrite, 50 parts of ice and 30 parts of concentrated hydrochloric acid are added and the mixture is stirred for three hours. After excess nitrite has been destroyed with sulfamic acid, the suspension is added dropwise to a further batch of reaction mixture 1 according to Example 1 and the pH is increased to 4.5 with solid sodium acetate in the course of 2 hours, resulting, after the coupling has taken place, in the compound of the formula

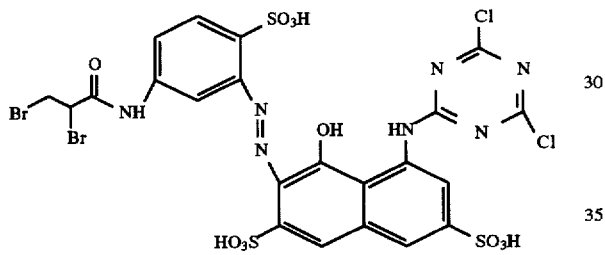

(iii) 80 parts of the compound prepared according to (i) are suspended in 600 parts of warm water and the suspension is added dropwise at pH 8.5 to the reaction mixture prepared according to (ii). The pH is kept at 8.5 with dilute sodium hydroxide solution for the duration of the condensation, the mixture is then heated to 30° C. and the pH is kept at 11 for 30 minutes. After neutralization with dilute hydrochloric acid, the reaction mixture is largely desalinated by dialysis and concentrated in vacuo. The compound of the formula

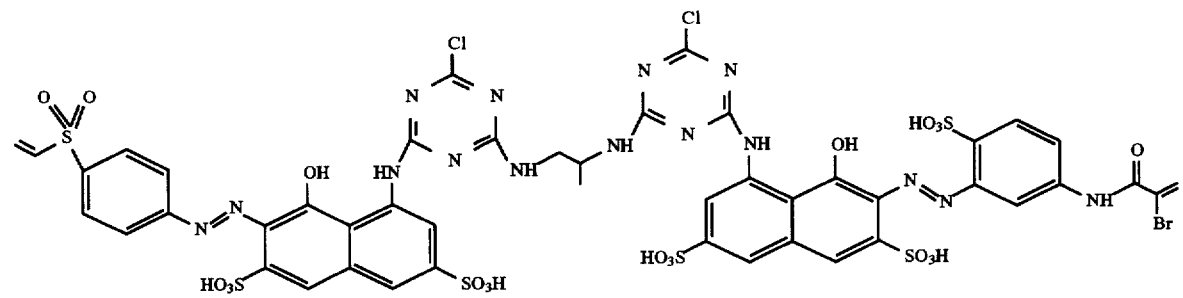

which dyes cotton in a red shade with good allround properties, is obtained.

EXAMPLES 27–31

The following dyes, each of which dyes cellulose in a red shade with good allround properties, can be prepared in a manner analogous to that described in Example 26.

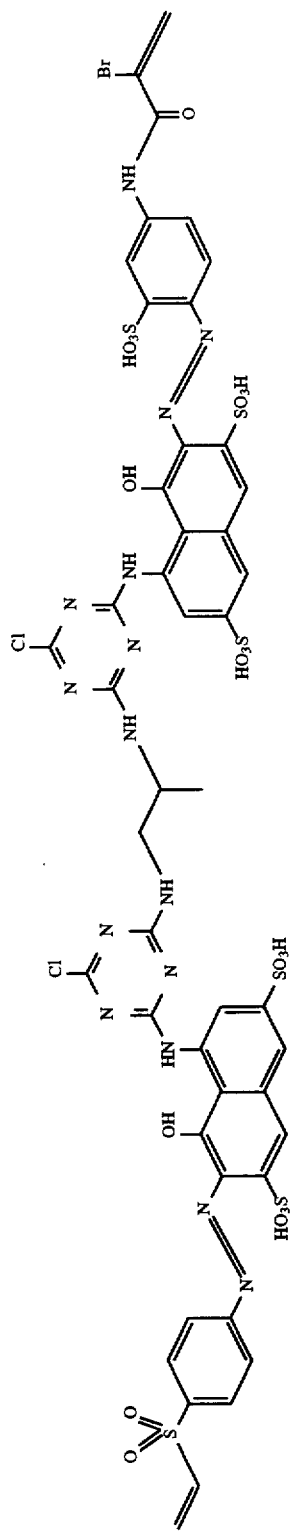
27
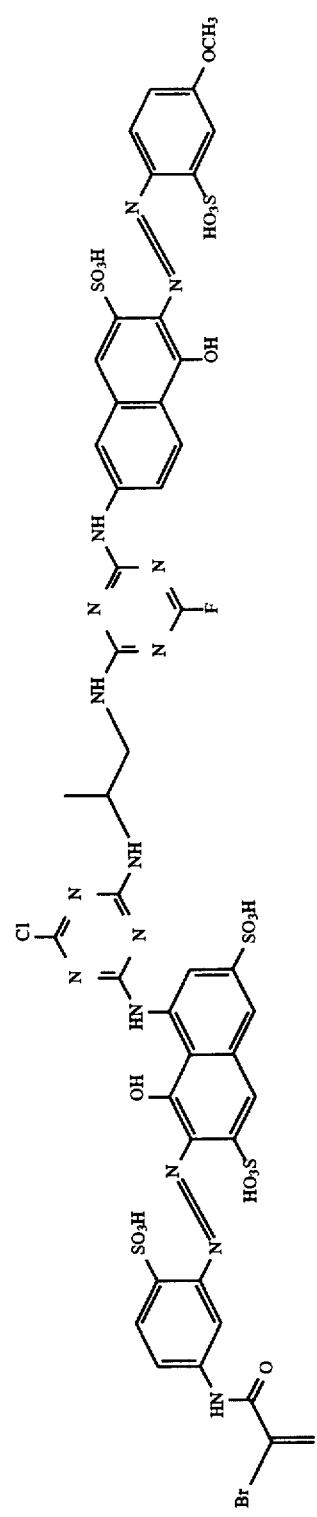
28
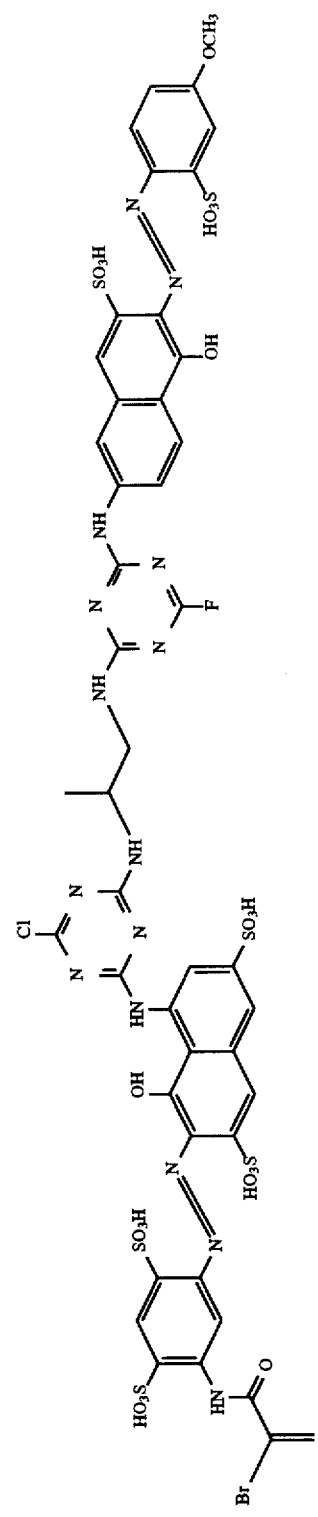
29

-continued
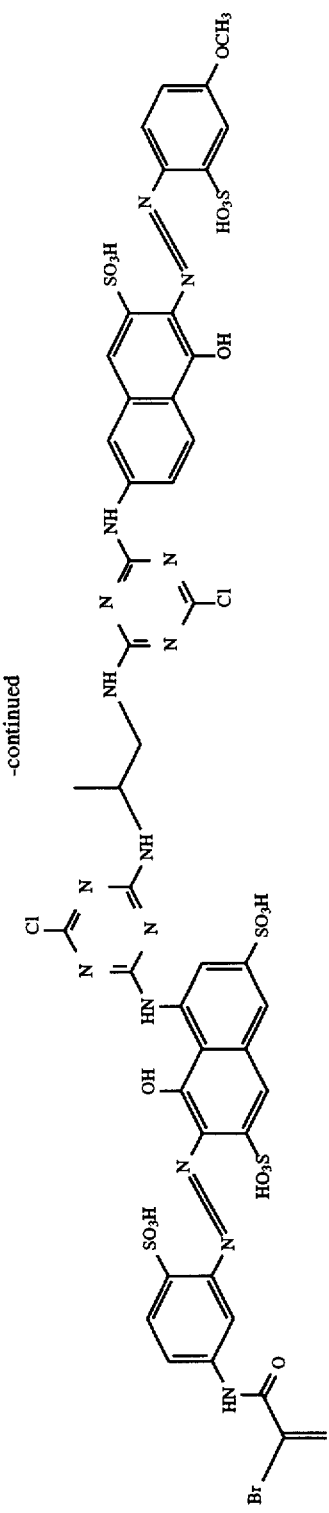
30
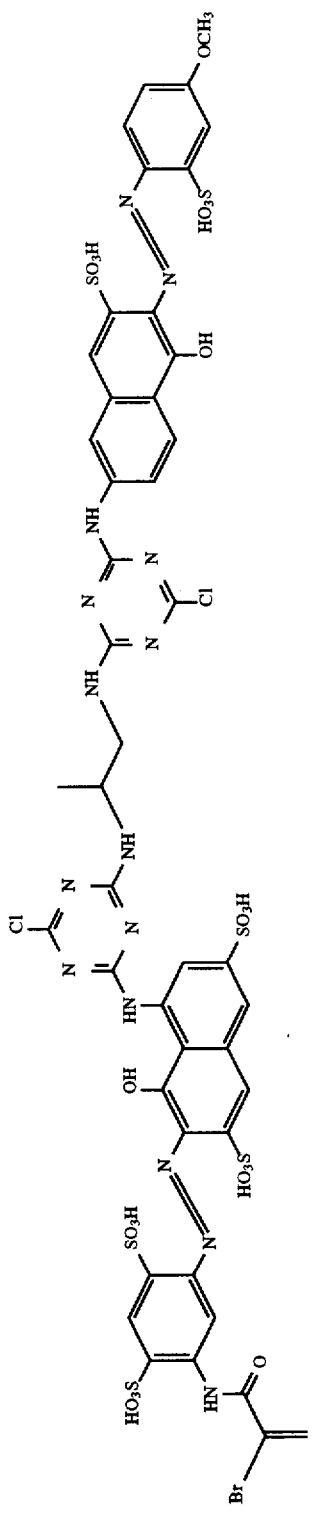
31

EXAMPLE 32

19 parts of cyanuric chloride are thoroughly mixed vigorously with 50 parts of ice/water and 5 parts of disodium hydrogen phosphate, with the addition of a wetting agent. A neutral solution of 32 parts of 1-amino-8-hydroxynaphthalene-3,6-disulfonic acid is added dropwise to the suspension formed such that the reaction mixture does not exceed a pH of 3. Thereafter, the pH is kept at 3 by addition of sodium hydroxide solution for a further 2 hours (reaction mixture 1).

19 parts of 1,3-phenylenediamine-4-sulfonic acid, dissolved in water under neutral conditions, are added dropwise to a suspension of 19 parts of cyanuric chloride with 50 parts of ice/water and 5 parts of disodium hydrogen phosphate, with addition of a wetting agent, such that the pH of the reaction mixture does not exceed the value 2.5. Thereafter, the pH is kept at 3 by addition of sodium hydroxide solution for a further 2 hours, 6 parts of ethanolamine are then added and the pH is increased to 9 and kept at this value with sodium hydroxide solution. The temperature is allowed to rise to room temperature during this procedure. When the condensation reaction has ended, the reaction mixture is cooled to 0° C., 7 parts of sodium nitrite, 50 parts of ice and 30 parts of concentrated hydrochloric acid are added and diazotization is carried out for 1.5 hours. Excess nitrite is destroyed with sulfamic acid (reaction solution 2).

Reaction solutions 1 and 2 obtainable as described above are combined, the pH is raised to 3.5 with sodium acetate solution in the course of 3 hours and the temperature is kept between 0° and 50° C. The mixture is then heated to 30° to 35° C. and a neutral solution of 32 parts of 1-amino-8-hydroxynaphthalene-3,6-disulfonic acid in 300 parts of water is added dropwise such that a pH of 3.5 is not exceeded (reaction solution 3).

40 parts of 5-(2,3-dibromopropionylamido)aniline-2-sulfonic acid are suspended in 400 parts of water. 7 parts of sodium nitrite, 50 parts of ice and 30 parts of concentrated hydrochloric acid are added and the mixture is stirred for 3 hours. Excess nitrite is destroyed with sulfamic acid and the resulting suspension is added to reaction solution 3 obtainable as described above. The pH is brought to 7 with dilute sodium hydroxide solution in the course of about 2 hours, the mixture is then heated to an internal temperature of 30° C. and the pH is increased to 11 and kept at this value for 30 minutes with dilute sodium hydroxide solution. At the end, the reaction mixture is brought to a pH of 7 with dilute hydrochloric acid, desalinated by dialysis and evaporated in vacuo. The compound of the formula

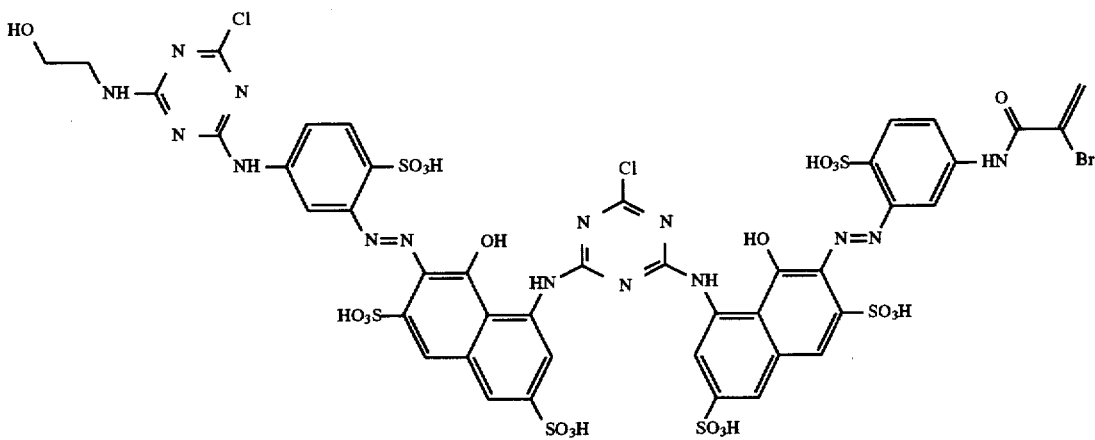

is obtained as a powder which dyes cellulose in red colour shades with good allround properties.

EXAMPLES 33-39

The following dyestuffs, each of which dyes cellulose in a red shade with good aground properties, can be prepared in a manner analogous to that described in Example 32.

35 36
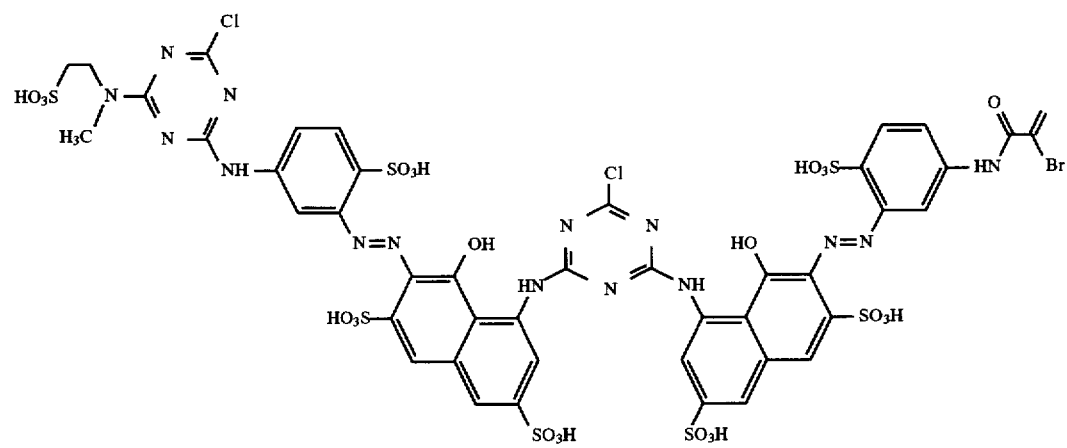
33
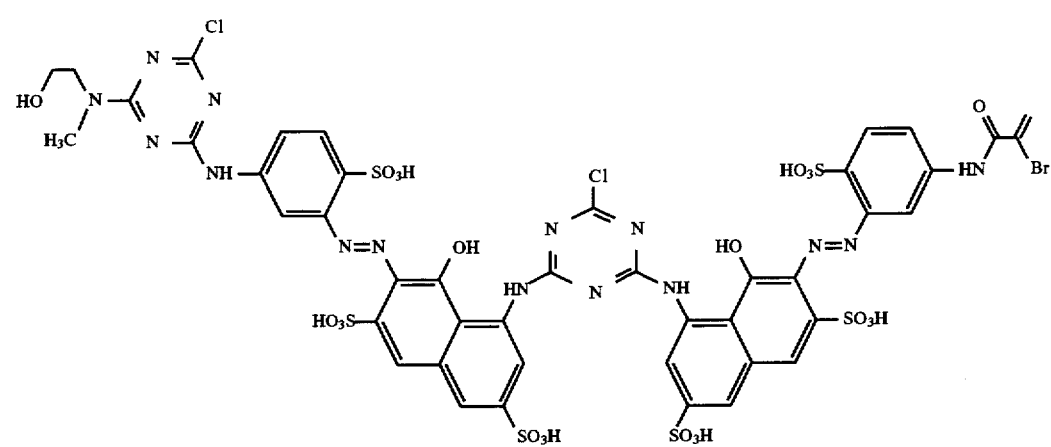
34
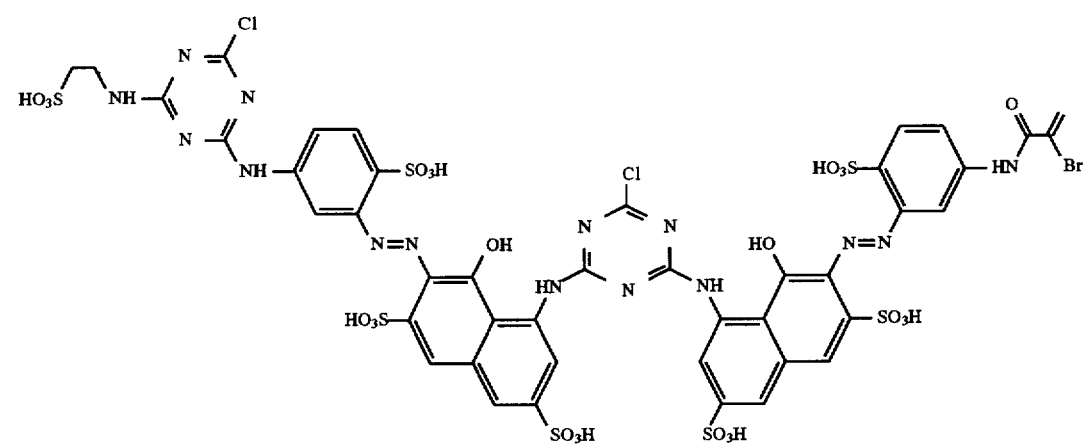
35

-continued
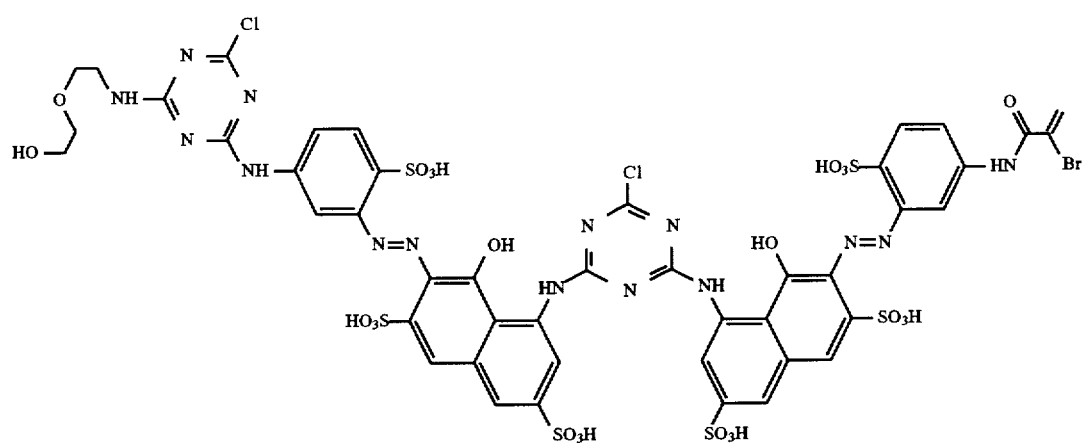
36
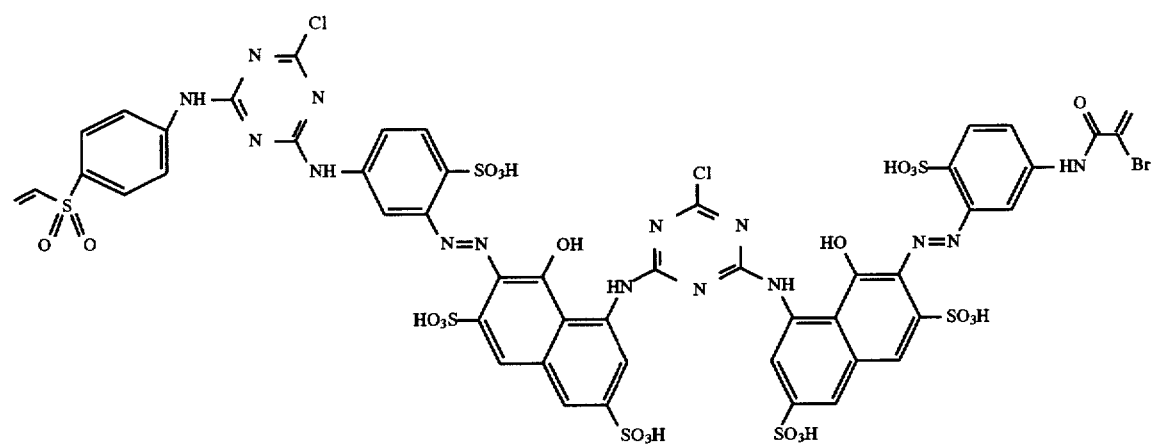
37
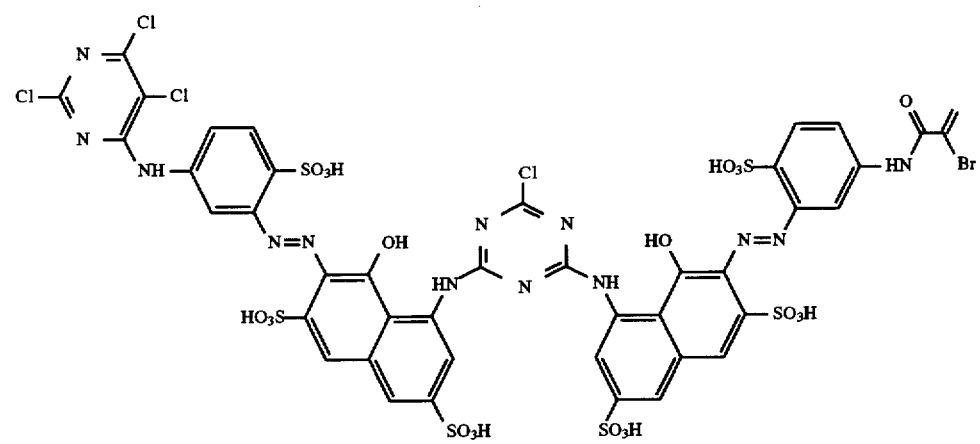
38

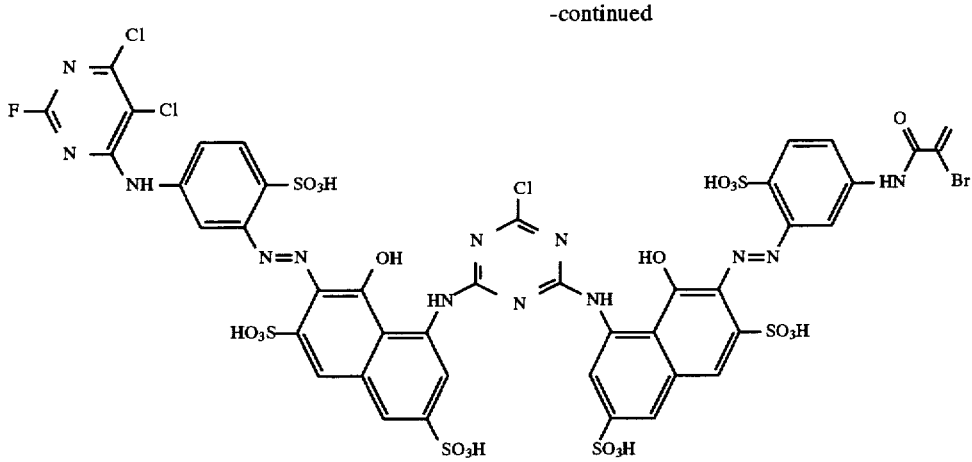

Dyeing instructions I 2 parts of the dye obtained according to Example 1 are dissolved in 400 parts of water; 1500 parts of a solution which comprises 53 g of sodium chloride per liter are added to this solution. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a nonionic detergent for a quarter of an hour, rinsed again and dried.

Dyeing instructions II 2 parts of the reactive dye obtained according to Example 1 are dissolved in 400 parts of water; 1500 parts of a solution which comprises 53 g of sodium chloride per liter are added to this solution. 100 parts of a cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing instructions III 8 parts of the reactive dye obtained according to Example 1 are dissolved in 400 parts of water; 1400 parts of a solution which comprises 100 g of sodium sulfate per liter are added to this solution. 100 parts of a cotton fabric are introduced into this dyebath at 25° C. After 10 minutes, 200 parts of a solution which comprises 150 g of trisodium phosphate per liter are added. Thereafter, temperature of the dyebath is increased to 60° C. in the course of 10 minutes. The temperature is kept at 60° C. for a further 90 minutes. Thereafter, the goods are rinsed, soaped at the boil with a nonionic detergent for a quarter of an hour, rinsed again and dried.

Dyeing instructions IV 4 parts of the reactive dye obtained according to Example 6 are dissolved in 50 parts of water. 50 parts of a solution which comprises 5 g of sodium hydroxide and 20 g of calcined sodium carbonate per liter are added to this solution. A cotton fabric is padded with the resulting solution such that it increases by 70% of its weight, and is then wound up onto a beam. The cotton fabric is stored at room temperature in this way for 3 hours. Thereafter, the dyed goods are rinsed, soaped at the boil with a nonionic detergent for a quarter of an hour, rinsed again and dried.

Dyeing instructions V 6 parts of the reactive dye obtained according to Example 6 are dissolved in 50 parts of water. 50 parts of a solution which comprises 16 g of sodium hydroxide and 0.04 liter of water-glass (38°Bé) per liter are added to this solution. A cotton fabric is padded with the resulting solution such that it increases by 70% of its weight and is then wound up onto a beam. The cotton fabric is stored in this way at room temperature for 10 hours. Thereafter, the dyed goods are rinsed, soaped at the boil with a nonionic detergent for a quarter of an hour, rinsed again and dried.

Dyeing instructions VI 2 parts of the reactive dye obtained according to Example 1 are dissolved in 100 parts of water with the addition of 0.5 part of sodium m-nitrobenzenesulfonate. A cotton fabric is impregnated with the resulting solution such that it increases by 75% of its weight and is then dried. The fabric is then impregnated with a solution, warmed to 20° C., which comprises 4 g of sodium hydroxide and 300 g of sodium chloride per liter and squeezed off to a weight increase of 75%, and the dyeing is steamed at 100° to 102° C. for 30 seconds, rinsed, soaped in a 0.3% boiling solution of a nonionic detergent for a quarter of an hour, rinsed and dried.

Dyeing instructions VII 0.1 part of dye according to Example 2 are dissolved in 200 parts of demineralized water, and 0.5 part of Glauber's salt, 0.1 part of a levelling agent and 0.5 part of sodium acetate are added. The pH is then brought to 5.5 with 80% acetic acid. The dyebath is heated at 50° C. for 10 minutes and 10 parts of a woollen fabric are then added. The dyebath is heated to 100° C. in the course of about 50 minutes and dyeing is carried out at this temperature for 60 minutes. Thereafter, the dyebath is allowed to cool to 90° C. and the dyed goods are removed. The woollen fabric is rinsed with hot and cold water and subsequently spun and dried. A brilliant dyeing which has very good light- and wetfastness properties is obtained.

Printing instructions I 3 parts of the reactive dye obtained according to Example 1 are sprinkled with rapid stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and the resulting printed material is dried and steamed in saturated steam at 102° C. for 2 minutes. The printed fabric is then rinsed, if appropriate soaped at the boil and rinsed again, and then dried.

Printing instructions II 5 parts of the reactive dye obtained according to Example 2 are sprinkled with rapid stirring into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the printing paste thus obtained, the stability of which meets industrial requirements, and is dried, and the resulting printed material is steamed at 102° C. in saturated steam for 8 minutes. The printed fabric is then rinsed, if appropriate soaped at the boil and rinsed again, and then dried.

What is claimed is:

1. A compound of the formula

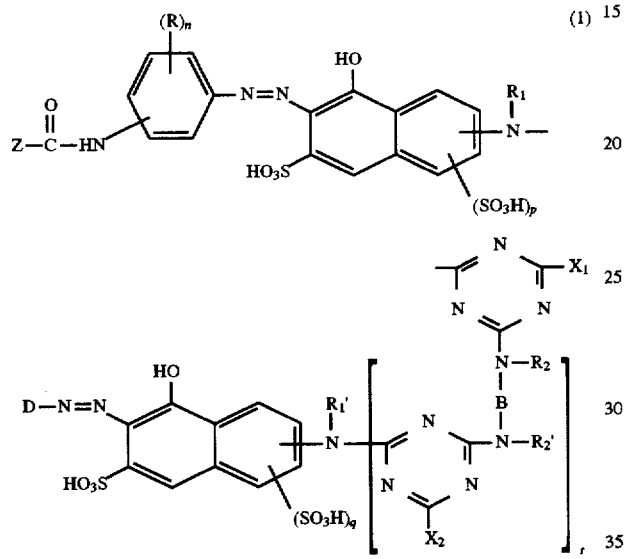

in which B is an aliphatic bridge member, (R)$_n$ is n identical or different radicals from the group consisting of C$_1$–C$_4$alkyl, C$_1$–C$_4$alkoxy, halogen and sulfo, n is the number 0, 1 or 2, R$_1$, R$_1$', R$_2$ and R$_2$' independently of one another are each hydrogen or substituted or unsubstituted C$_1$–C$_4$alkyl, X$_1$ and X$_2$ independently of one another are each halogen, 3-carboxypyridin-1-yl or 3-carbamoylpyridin-1-yl, Z is a radical —CHX—CH$_2$—X or —CX=CH$_2$ and X is halogen, D is the radical of a diazo component of the benzene or naphthalene series and p, q and t independently of one another are each the number 0 or 1.

2. A compound according to claim 1, in which (R)$_n$ is 0, 1 or 2 identical or different radicals from the group consisting of methyl, methoxy and sulfo.

3. A compound according to claim 1, in which X$_1$ is chlorine and X$_2$ is chlorine or fluorine.

4. A compound according to claim 1, in which R$_1$ and R$_1$' independently of one another are each hydrogen or C$_1$–C$_4$alkyl.

5. A compound according to claim 1, in which R$_2$ and R$_2$' independently of one another are each hydrogen or C$_1$–C$_4$alkyl which is unsubstituted or substituted by hydroxyl.

6. A compound according to claim 1, in which p is the number 1.

7. A compound according to claim 1, in which D is a phenyl or naphthyl radical which is unsubstituted or substituted by sulfo, C$_1$–C$_4$alkyl, C$_1$–C$_4$alkoxy, halogen or by a reactive radical of the formula

or

in which Y is vinyl, β-chloroethyl, β-sulfatoethyl, β-thiosulfatoethyl, β-acetoxyethyl, β-phenoxyethyl or β-phosphatoethyl and Z is as defined in claim 1.

8. A compound according to claim 1, in which D is a radical of the formula

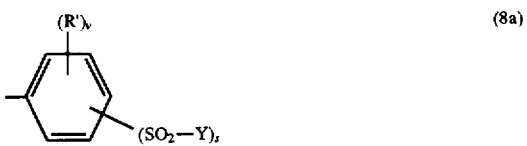

or

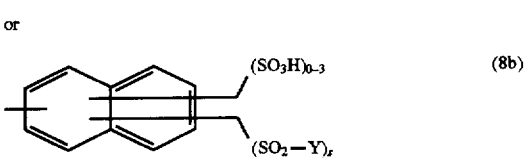

in which (R')$_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is $\leq 1$.

9. A compound according to claim 1, in which B is straight-chain or branched C$_2$–C$_{12}$alkylene which is unsubstituted or substituted by hydroxyl, C$_1$–C$_4$alkoxy, sulfato or sulfo or interrupted once or several times by —O— or —NR$_3$—, in which R$_3$ is hydrogen or C$_1$–C$_4$alkyl.

10. A compound according to claim 1, in which B is straight-chain or branched C$_2$–C$_6$alkylene.

11. A compound according to claim 1 of the formula (1), in which B is straight-chain or branched C$_2$–C$_6$alkylene, which is unsubstituted or substituted by hydroxyl, sulfo or sulfato, (R)$_n$ is n identical or different radicals from the group consisting of C$_1$–C$_4$alkyl, C$_1$–C$_4$alkoxy and sulfo, n is the number 0, 1 or 2, R$_1$ and R$_1$' independently of one another are each hydrogen or C$_1$–C$_4$alkyl, R$_2$ and R$_2$' independently of one another are each hydrogen or C$_1$–C$_4$alkyl which is unsubstituted or substituted by hydroxyl, X$_1$ and X$_2$ independently of one another are each chlorine or fluorine, Z is a radical —CHX—CH$_2$—X or —CX=CH$_2$ and X is chlorine or bromine, D is a phenyl or naphthyl radical which is unsubstituted or substituted by sulfo, C$_1$–C$_4$alkyl, C$_1$–C$_4$alkoxy, halogen or by a fibre-reactive radical —SO$_2$—Y, Y is vinyl or β-sulfatoethyl and p, q and t independently of one another are each the number 0 or 1.

12. A compound according to claim 1, in which t is the number 0.

13. A compound according to claim 1 of the formula

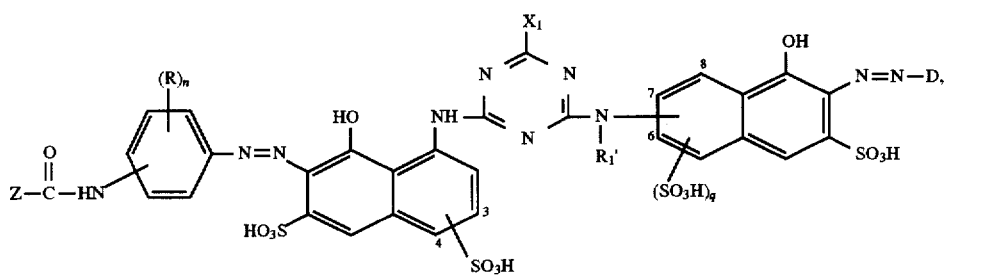
(1a)

in which Z is the group —CHBr—CH$_2$Br or —CBr=CH$_2$, (R)$_n$ is 0 to 2 identical or different radicals from the group consisting of sulfo, methyl and methoxy, X$_1$ is chlorine, R$_1$' is hydrogen, methyl or ethyl, q is the number 0 or 1 and D is a radical of the formula

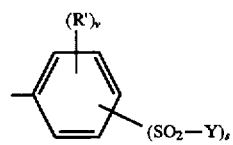
(8a)

in which (R')$_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is ≧1.

14. A compound according to claim 1 of the formula

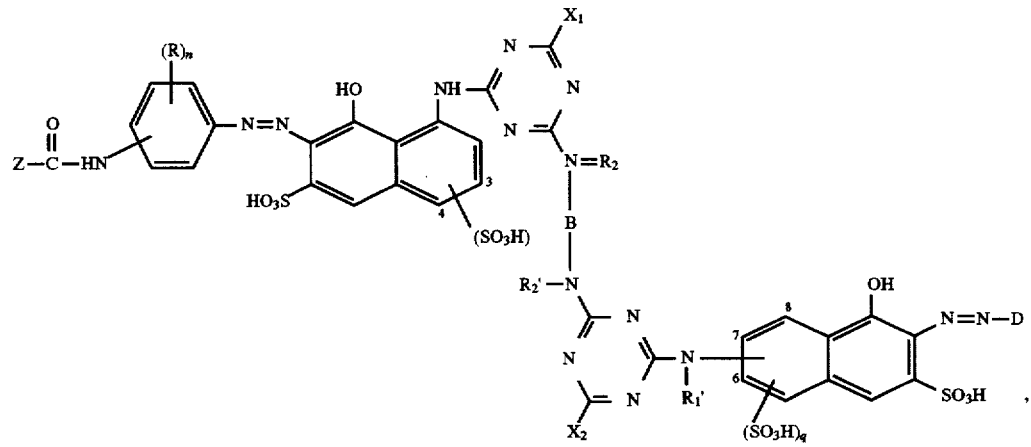
(1b)

in which Z is the group —CHBr—CH$_2$Br or —CBr=CH$_2$, (R)$_n$ is 0 to 2 identical or different radicals from the group consisting of sulfo, methyl and methoxy, X$_1$ is chlorine and X$_2$ is chlorine or fluorine, R$_1$' is hydrogen, methyl or ethyl and R$_2$ and R$_2$' independently of one another are each hydrogen, methyl, ethyl or β-hydroxyethyl, q is the number 0 or 1 and D is a radical of the formula

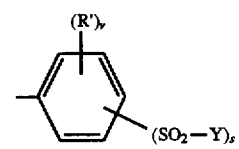
(8a)

in which (R')$_v$ is v identical or different radicals from the group consisting of methyl, methoxy and sulfo, Y is vinyl or β-sulfatoethyl and v is the number 0, 1 or 2 and s is the number 0 or 1, where the sum of (v+s) is >1.

15. A process for the preparation of a compound of the formula (1) according to claim 1, which comprises reacting in each case approximately 1 molar equivalent of a compound of the formula

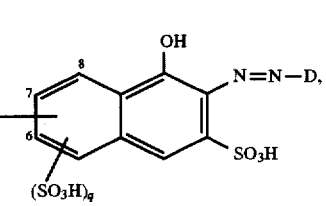
(9a)

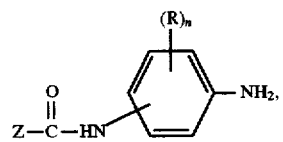
D—NH$_2$, (9b)

-continued

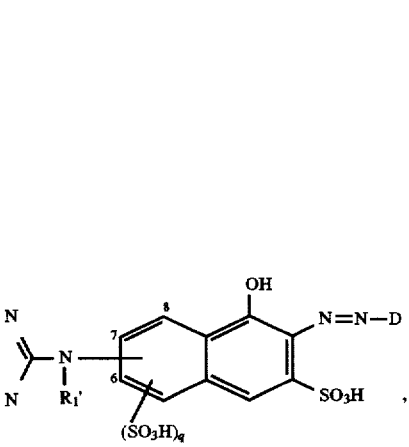
(10a)

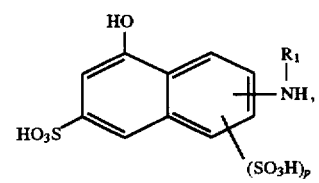

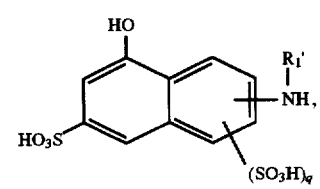
(10b)

-continued

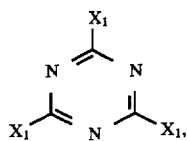
(11a)

and, if t is the number 1, additionally in each case approximately 1 molar equivalent of a compound of the formula

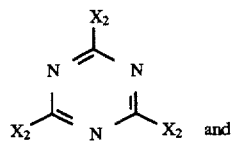 and
(11b)

-continued $$R_2'HN-B-NHR_2,$$ (12)

in which B, D, $(R)_n$, $R_1$, $R_1'$, $R_2$, $R_2'X_1$, $X_2$, Z, p, q and t are in each case as defined above, with one another in any order.

16. A process for dyeing or printing fibre material containing hydroxyl groups or containing nitrogen, which process comprises the step of applying to said fibre material a tinctorially effective amount of a compound of the formula (1) according to claim 1.

17. A process according to claim 16, wherein said fibre material is cellulosic fibre material.

* * * * *